United States Patent
Ikeda et al.

(10) Patent No.: US 10,493,769 B2
(45) Date of Patent: Dec. 3, 2019

(54) INK SETS AND INK-JET RECORDING METHOD

(71) Applicant: Konica Minolta, Inc., Tokyo (JP)

(72) Inventors: Masashi Ikeda, Koganei (JP); Katsunori Goi, Sagamihara (JP); Toshiyuki Takabayashi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/098,633

(22) PCT Filed: May 18, 2017

(86) PCT No.: PCT/JP2017/018614
§ 371 (c)(1),
(2) Date: Nov. 2, 2018

(87) PCT Pub. No.: WO2017/200031
PCT Pub. Date: Nov. 23, 2017

(65) Prior Publication Data
US 2019/0143710 A1 May 16, 2019

(30) Foreign Application Priority Data
May 19, 2016 (JP) .................. 2016-100398

(51) Int. Cl.
*C09D 11/40* (2014.01)
*B41J 2/21* (2006.01)
(Continued)

(52) U.S. Cl.
CPC .............. *B41J 2/21* (2013.01); *B41J 2/135* (2013.01); *C09D 11/322* (2013.01); *C09D 11/38* (2013.01); *C09D 11/40* (2013.01)

(58) Field of Classification Search
None
See application file for complete search history.

(56) References Cited

U.S. PATENT DOCUMENTS 8,653,153 B1 2/2014 Vanbesien et al.
8,669,298 B1 3/2014 Vanbesien et al.
(Continued)

FOREIGN PATENT DOCUMENTS

EP 1826005 A1 8/2007
JP 2010013574 A 1/2010
(Continued)

OTHER PUBLICATIONS

International Search Report dated Jun. 20, 2017 for PCT/JP2017/018614 and English translation.
(Continued)

*Primary Examiner* — Scott A Richmond
(74) *Attorney, Agent, or Firm* — Lucas & Mercanti, LLP

(57) ABSTRACT

Ink sets comprising an ink set A which comprises a yellow ink, a magenta ink, a cyan ink, and a black ink and an ink set B which comprises at least two inks selected from among an orange ink, a green ink, a violet ink, and a blue ink. In the ink set B, the orange ink contains an orange pigment having a cyclic structure and a basic moiety in the cyclic structure, the green ink contains a green pigment having a copper phthalocyanine structure, and the violet ink contains a violet pigment having a dioxazine skeleton. The inks included in the ink set A and ink set B each contain, as a gellant, at last one compound selected from among compounds represented by R1-CO—R2 (general formula (G1)) and compounds represented by R3-COO—R4 (general formula (G2)). In the general formulae (G1) and (G2), R1 to R4 each independently represent a $C_{9-25}$ chain hydrocarbon group.

4 Claims, 1 Drawing Sheet

(51) Int. Cl.
      *C09D 11/322*       (2014.01)
      *C09D 11/38*        (2014.01)
      *B41J 2/135*        (2006.01)

(56) References Cited

U.S. PATENT DOCUMENTS

| | | |
|---|---|---|
| 2010/0018438 A1 | 1/2010 | Claes et al. |
| 2014/0171537 A1 | 6/2014 | Vanbesien et al. |
| 2016/0002482 A1* | 1/2016 | Merchak .............. C09D 11/037 428/207 |
| 2016/0244628 A1* | 8/2016 | Breton .................. C09D 11/34 |
| 2017/0158891 A1* | 6/2017 | Allen .................... C09D 11/101 |

FOREIGN PATENT DOCUMENTS

| | | |
|---|---|---|
| JP | 2014118567 A | 6/2014 |
| JP | 2014118570 A | 6/2014 |
| JP | 2014118571 A | 6/2014 |
| JP | 2015083647 A | 4/2015 |
| WO | 2006061981 A1 | 6/2006 |

OTHER PUBLICATIONS

Extended European Search Report dated Apr. 8, 2018 for corresponding European Patent Application No. 17799455.5.

\* cited by examiner

INK SETS AND INK-JET RECORDING METHOD

CROSS REFERENCE TO RELATED APPLICATION

This Application is a 371 of PCT/JP2017/018614 filed on May 18, 2017 which, in turn, claimed the priority of Japanese Patent Application No. 2016-100398 filed on May 19, 2016, both applications are incorporated herein by reference.

TECHNICAL FIELD

The present invention relates to an ink set and an ink-jet recording method.

BACKGROUND ART

An active ray-curable ink is known as one of the inks to be used in an ink-jet recording system. The active ray-curable ink is an ink containing a polymerizable compound that is cured by irradiation with active rays. Because such an active ray-curable ink further contains a gellant, the ink gels due to the crystallization of the gellant when landing on a recording medium and cooled, and hence the pinning property of the ink is enhanced, whereby the gloss of the ink can be easily adjusted.

In an ink-jet recording system, a full color image can be formed by selecting, from among a yellow ink, a magenta ink, a cyan ink, and a black ink, a combination of suitable inks in accordance with a color to be formed and by superimposing the selected inks. Also, the color gamut of an image to be formed can be further expanded by using at least one of an orange ink, a green ink, and a violet ink in combination as a special color.

In the following cited literatures 1 to 3, an orange radiation-curable gel ink, a green radiation-curable gel ink, and a violet radiation-curable gel ink, each containing a gellant, are disclosed as active ray-curable inks for special colors and for an ink-jet recording system.

CITATION LIST

Patent Literature

[Patent Literature 1] Japanese Patent Application Publication No. 2014-118567
[Patent Literature 2] Japanese Patent Application Publication No. 2014-118570
[Patent Literature 3] Japanese Patent Application Publication No. 2014-118571

SUMMARY OF THE INVENTION

Problem to be Solved by the Invention

However, it has been found that in an image formed by an ink-jet recording method using 5 or 6 color inks including three active ray-curable inks of a yellow ink, a magenta ink, and a cyan ink and 2 or 3 color inks selected from among the above orange radiation-curable gel ink, green radiation-curable gel ink, and violet radiation-curable gel ink, a difference in gloss is seen depending on color and the color gamut reproducibility is not sufficient Therefore, it is an object of the present invention to provide an ink set for an ink-jet recording system and an ink-jet recording method that are capable of forming an image in which a difference in gloss depending on color is small and color gamut reproducibility is excellent.

Means for Solving the Problem

In order to achieve the object as described above, the present invention comprises an ink set A which comprises a yellow ink, a magenta ink, a cyan ink, and a black ink and an ink set B which comprises at least two inks selected from among an orange ink, a green ink, a violet ink, and a blue ink, in which of the ink set B, the orange ink contains an orange pigment having a cyclic structure and a basic moiety in the cyclic structure, the green ink contains a green pigment having a copper phthalocyanine structure, and the violet ink contains a violet pigment having a dioxazine skeleton, and in which the inks included in the ink set A and ink set B each contain, as a gellant, at least one compound selected from among compounds represented by the following general formula (G1) and compounds represented by the following general formula (G2):

R1-CO—R2         General Formula (G1)

R3-COO—R4        General Formula (G2)

In the general formulae (G1) and (G2), R1 to R4 each independently represents a $C_{9-25}$ chain hydrocarbon group.

Also, the present invention relates to an ink-jet recording method for sequentially supplying each of the inks composing the ink sets to a recording medium from a plurality of ink heads arranged along a conveying direction of the recording medium.

Advantageous Effects of the Invention

According to the present invention having such a configuration, an ink set for an ink-jet recording system and an ink-jet recording method, which are capable of forming an image in which a difference in gloss depending on color is small and color gamut reproducibility is excellent, can be obtained.

MODE FOR CARRYING OUT THE INVENTION

Figure 1:
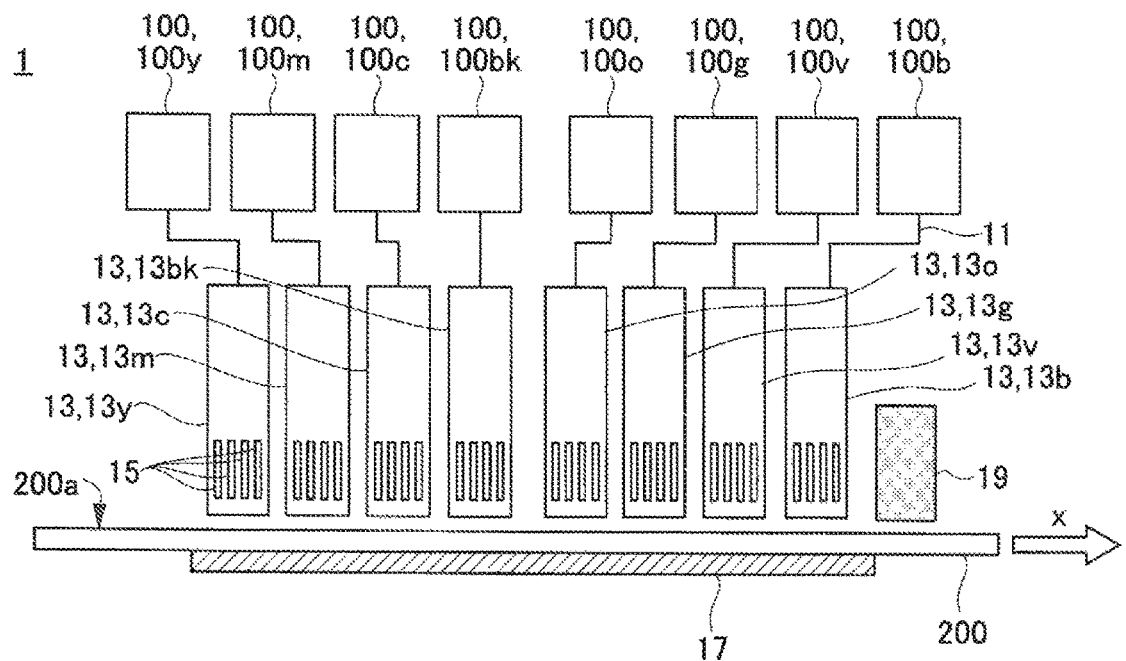
FIG. 1 is a side view illustrating a configuration example of a recording apparatus for implementing an ink-jet recording method according to an embodiment.

Hereinafter, an embodiment of the present invention will be described in the order of an ink set and an ink-jet recording method using this ink set.
<<Ink Set>>
Ink sets according to an embodiment are ones comprising a plurality of color inks to be used for forming an image by an ink-jet recording apparatus. The ink sets are composed of an ink set A and an ink set B. The ink set A is composed of process color inks and includes a yellow ink, a magenta ink, a cyan ink, and a black ink. On the other hand, the ink set B is composed of special color inks and includes at least two inks selected from among an orange ink, a green ink, a violet ink, and a blue ink. Also, each of the ink sets is one in which the ink of each color is stored in an individual storage tank.

Each of the inks included in the ink set A and the ink set B is an active ray-curable ink that undergoes a sol-gel phase transition due to temperature change. Each of such inks may contain a pigment of each color and a polymer dispersant, and each may contain a dispersion synergist. Further, each ink contains a gellant, a polymerizable compound, a polymerization initiator, and further other materials as required.

Among them, the pigment in each of the inks included in the ink set B particularly has a unique molecular structure. The gellant in each of the inks included in the ink set A and the ink set B has a unique molecular structure. It is preferable that the polymer dispersants, the gellants, the polymerizable compounds, and the polymerization initiators contained in the respective inks are the same compound as each other, respectively, from the viewpoint of further enhancing the affinity between inks and forming a higher-definition image.

Hereinafter, the materials contained in each of the inks composing the ink sets will be described in the order of a pigment, a polymer dispersant, a dispersion synergist, a gellant, a polymerizable compound, a polymerization initiator, and other materials, and subsequently the physical properties of each ink and a manufacturing method thereof will be described.

<Pigment>

Pigments contained in the process color inks composing the ink set A, that is, a yellow ink, a magenta ink, a cyan ink, and a black ink are not particularly limited, but can be organic pigments or inorganic pigments having, for example, the following numbers described in the color index. On the other hand, the pigments contained in the special color inks composing the ink set B, that is, an orange ink, a green ink, and a violet ink have a unique configuration. The pigments contained in each ink are as follows, and only one type of the pigments of each color, which are mentioned as examples, may be contained in the ink of each color, or two or more types may be contained.

[Yellow Pigment (Ink Set A)]

The yellow pigment may be any pigment by which a yellow ink landing on a recording medium and cured can exhibit yellow color. As such yellow pigments, the pigments having the following C. I. Pigment Yellow (hereinafter simply referred to as "PY") numbers, that is, PY1, PY3, PY12, PY13, PY14, PY17, PY34, PY35, PY37, PY55, PY74, PY81, PY83, PY93, PY94, PY95, PY97, PY108, PY109, PY110, PY137, PY138, PY139, PY153, PY154, PY155, PY157, PY166, PY167, PY168, PY180, PY185, and PY193 are mentioned as examples.

[Magenta Pigment (Ink Set A)]

The magenta pigment may be any pigment by which a magenta ink landing on a recording medium and cured can exhibit magenta color. As such magenta pigments, the pigments having the following C. I. Pigment Red (hereinafter simply referred to as PR) numbers, that is, PR3, PR5, PR19, PR22, PR31, PR38, PR43, PR48:1, PR48:2, PR48:3, PR48:4, PR48:5, PR49:1, PR53:1, PR57:1, PR57:2, PR58:4, PR63:1, PR81, PR81:1, PR81:2, PR81:3, PR81:4, PR88, PR104, PR108, PR112, PR122, PR123, PR144, PR146, PR149, PR166, PR168, PR169, PR170, PR177, PR178, PR179, PR184, PR185, PR208, PR216, PR226, and PR257 are mentioned as examples. In addition to these, C. I. Pigment Violet (hereinafter simply referred to as "PV") 19, and further mixed crystal compounds of PV19 and PR202 are mentioned as examples.

[Cyan Pigment (Ink Set A)]

The cyan pigment may be any pigment by which a cyan ink landing on a recording medium and cured can exhibit cyan color. As such cyan pigments, the pigments having the following C. I. Pigment Blue (hereinafter simply referred to as "PB") numbers, that is, PB1, PB15, PB15:1, PB15:2, PB15:3, PB15:4, PB15:6, PB16, PB17-1, PB22, PB27, PB28, PB29, PB36, and PB60 are mentioned as examples.

[Black Pigment (Ink Set A)]

The black pigment may be any pigment by which a black ink landing on a recording medium and cured can exhibit black color. As such black pigments, the pigments having the following C. I. Pigment Black (hereinafter simply referred to as "PBk") numbers, that is, PBk7 (carbon black), PBk28, and PBk26 are mentioned as examples.

[Orange Pigment (Ink Set B)]

The orange pigment is a pigment by which an ink landing on a recording medium and cured can exhibit orange color, and contains a basic orange pigment having a cyclic structure and having a basic moiety in the cyclic structure. Only one type of such basic orange pigments may be contained in the orange ink, or two or more types may be contained.

The cyclic structure of the basic orange pigment is a non-aromatic cyclic structure. Examples of such a cyclic structure include an alicyclic structure in which a cyclic structure is composed only of carbon and hydrogen, a heterocyclic structure in which a cyclic structure contains carbon and other atoms, and a Spiro ring structure in which a plurality of cyclic structures share one atom. The cyclic structure may contain a double bond.

The basic moiety means a moiety that can have a positive charge. Examples of the basic moiety include amino groups including a secondary amino group, a tertiary amino group, and a quaternary ammonium group, and nitrogen-containing heterocyclic groups having a skeleton of pyrrole, pyrazole, pyrrolidine, or piperidine. It is preferable that the basic moiety is a secondary amino group or a tertiary amino group from the viewpoint of preventing degradation of an ink containing a polymerizable compound, caused by a reaction with a component in the ink.

From the viewpoint of sufficiently associating the later-described dispersion synergist with the basic orange pigment to further suppress occurrence of excessive gloss, it is preferable that the basic orange pigment has two or more basic moieties in the cyclic structure, and more preferable that it has three or more basic moieties.

As the basic orange pigment, the pigments having the following structure and having the following C. I. Pigment Orange (hereinafter simply referred to as "PO") numbers, that is, PO36, PO64, and PO71 are mentioned as examples. Each of PO36 and PO71 has two basic moieties (N—H bonds) in the cyclic structure, and PO64 has four basic moieties in the cyclic structure.

[Chemical Formula 1]

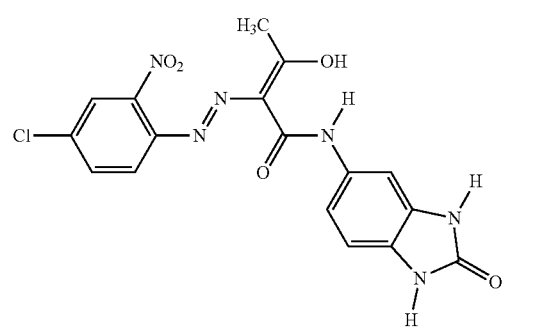

PO36

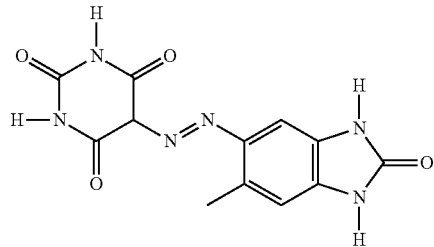

PO64

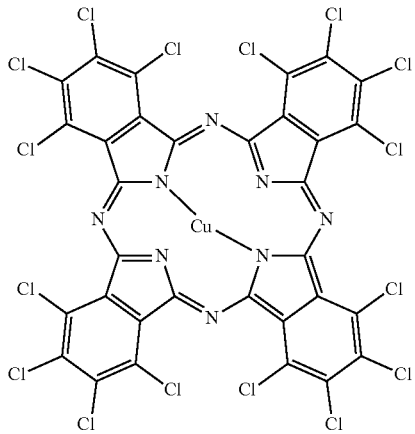

PG7

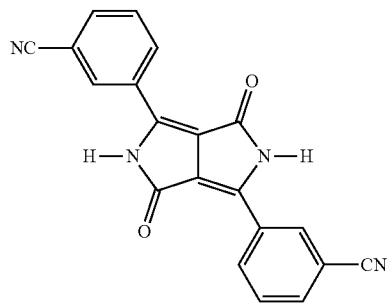

PO71

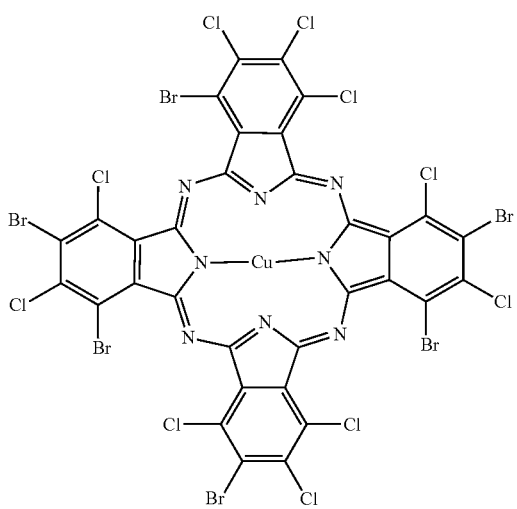

PG36

Examples of commercially available products of PO36 include Novoperm Orange HL (manufactured by CLARIANT). Examples of commercially available products of PO64 include ORANGE K 2960 (manufactured by BASF). Examples of commercially available products of PO71 include IRGAZIN ORANGE D2905 (manufactured by BASF: "IRGAZIN" is a registered trademark of the company).

In addition to the basic orange pigments as described above, the orange pigment may contain a pigment by which an ink landing on a recording medium and cured can exhibit orange color.

[Green Pigment (Ink Set B)]

The green pigment is a pigment by which an ink landing on a recording medium and cured can exhibit green color, and includes a green pigment having a halogenated copper phthalocyanine structure having an organic acid residue. Only one type of the green pigments having the halogenated copper phthalocyanine structure may be contained in a green ink, or two or more types may be contained.

As the green pigment having the halogenated copper phthalocyanine structure, the pigments having the following structure and having the following C. I. Pigment Green (hereinafter simply referred to as "PG") numbers, that is, PG7 and PG36 are mentioned as examples.

Examples of commercially available products of PG7 include PV Fast Green GNX (manufactured by CLARIANT) and HELIOGEN Green D8370 (manufactured by BASF: "HELIOGEN" is a registered trademark of the company). Examples of commercially available products of PG36 include FASTOGEN Green 2YK (manufactured by DIC: "FASTOGEN" is a registered trademark of the company).

In addition to the green pigments having a halogenated copper phthalocyanine structure as described above, the green pigment may contain a pigment by which an ink landing on a recording medium and cured can exhibit green color.

[Violet Pigment (Ink Set B)]

The violet pigment is a pigment by which an ink landing on a recording medium and cured can exhibit violet color, and includes a violet pigment having a dioxazine skeleton. Only one type of the violet pigments having a dioxazine skeleton may be contained in a violet ink, or two or more types may be contained.

As the violet pigment having a dioxazine skeleton, the pigments having the following structure and having the following C. I. Pigment Violet (hereinafter simply referred to as "PV") numbers, that is, PV23 and PV37 are mentioned as examples.

[Chemical Formula 3]

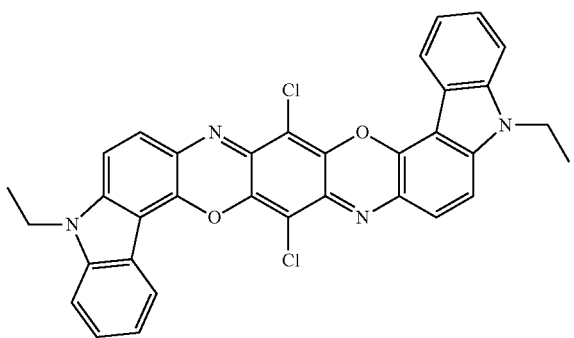

PV23

PV37

Examples of commercially available products of PV23 include FASTOGEN Super Violet LBP02, FASTOGEN Super Violet LBP03, and FASTOGEN Super Violet LBP04 (all are manufactured by DIC) are mentioned as examples. Also, CROMOPHTAL Violet D5808 (manufactured by BASF, "CROMOPHTAL" is a registered trademark of the company) is mentioned as an example. Further, HOSTAPERM Violet RL-NF, HOSTAPERM Violet P-RL, and PV Fast Violet RL (all are manufactured by CLARIANT, "HOSTAPERM" is a registered trademark of the company) are included. Examples of commercially available products of PV37 include CROMOPHTAL Violet D5700 (manufactured by BASF).

In addition to the violet pigments having a dioxazine skeleton as described above, the violet pigment may contain a pigment by which an ink landing on a recording medium and cured can exhibit violet color.

[Blue Pigment (Ink Set B)]

The blue pigment is a pigment by which an ink landing on a recording medium and cured can exhibit blue color. As such a blue pigment, the pigments having the following C. I. Pigment Blue (hereinafter simply referred to as "PB") numbers, that is, PB15:6, PB25, and PB60 having the following structure are mentioned as examples.

[Chemical Formula 4]

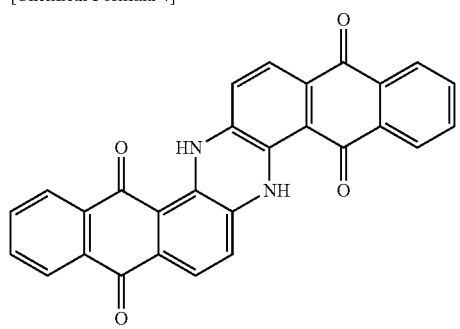

PB60

In addition to at least one type of the blue pigments as described above, the blue pigment may contain a pigment by which an ink landing on a recording medium and cured can exhibit blue color.

[Particle Size of Pigment]

The average particle size of each pigment as described above is preferably from 0.08 μm to 0.5 μm, and the maximum particle size is preferably from 0.3 μm to 10 μm, and more preferably from 0.3 μm to 3 μm. Herein, the average particle size means a value obtained by a dynamic light scattering method using Data Sizer Nano ZSP manufactured by Malvern Panalytical. Because the concentration of the ink containing a pigment is high and light is not transmitted by this measuring instrument, the measurement is performed after the ink is diluted to 200 times its initial volume. The measurement temperature is set to room temperature (25° C.). Clogging of an ink head in an ink-jet recording apparatus can be suppressed by adjusting the particle size of a pigment, whereby the storage stability, transparency, and curing sensitivity of an ink can be maintained.

[Content of Pigment]

The content of the pigment in each ink may be such that the coloring of each color in an image formed by using these inks is sufficient and the viscosity of each ink is within a range where the ink can be ejected from the ink head. From the above viewpoint, the content of the pigment in each ink is preferably 0.1% by mass or more and 20% by mass or less based on the total mass of the ink, and more preferably 0.4% by mass or more and 10% by mass or less.

<Polymer Dispersant>

The polymer dispersant has a function of enhancing the dispersibility of a pigment by directly adsorbing to the surface of the pigment or indirectly adsorbing through the later-described dispersion synergist. Examples of the polymer dispersant include hydroxyl group-containing carboxylic acid esters, salts of long chain polyamino amide and high molecular weight acid ester, salts of high molecular weight polycarboxylic acid, salts of long chain polyamino amide and polar acid ester, high molecular weight unsaturated acid esters, polymer copolymers, modified polyurethanes, modified polyacrylates, polyether ester type anion activators, naphthalene sulfonic acid formalin condensate salts, aromatic sulfonic acid formalin condensate salts, polyoxyethylene alkyl phosphate esters, polyoxyethylene nonyl phenyl ethers, and stearyl amine acetates.

Among them, a polymer dispersant having a basic group is preferable, and a comb type block copolymer having a basic group is more preferable.

As a side chain of a comb type block copolymer having a basic group, a long chain polyoxyalkyl group (EO-PO copolymerization group) is preferable. Examples of the comb type block copolymer include those in which the main chain is a polymer of an acrylate ester and the side chain is a long chain polyoxyalkyl group (EO-PO copolymerization group).

The basic group in the comb type block copolymer having a basic group is preferably a tertiary, secondary, or primary amine group.

In the comb type block copolymer having a basic group, the graft-polymerized side chain causes steric hindrance, so aggregation of the pigments can be suppressed. Because the primary particle size of the pigment is as small as 50 nm or less, the pigment has a strong interaction between particles and has aggregation-prone properties. Therefore, an improvement in the dispersibility by the comb block copolymer is particularly conspicuous in an aqueous dye or an ink containing a pigment having a small particle size as described above. As the dispersibility of the pigment is enhanced by the above action, clogging of an ink head in an ink-jet recording apparatus due to the aggregated pigment particles and an ejection failure of an ink due to this are less likely to occur.

Examples of commercially available products of the comb type block copolymer having a basic group include DISPERBYK-161, 168, and 2155, BYKJet9150, and BYKJet9151 (all are manufactured by BYK: "BYK" and "DISPERBYK" are registered trademarks of the company). Also, the examples thereof include EFKA PX4701, FA4431, and EFKA7701 (all are manufactured by BASF: "EFKA" is a registered trademark of the company). Also, the examples thereof include PB-821, 822, and 824 (all are manufactured by Ajinomoto Fine-Techno Co., Inc.). Also, the examples thereof include Solsperse24000GR, 32000, 35000, and 39000, J-100, J-180, J-200, and X-300 (all are manufactured by Lubrizol Corp.: "Solsperse" is a registered trademark of the company).

<Dispersion Synergist>

A dispersion synergist is a dispersion aid to be used for enhancing the dispersibility of a pigment, and is particularly effectively used when a polymer dispersant alone never adsorbs to the surface of a pigment and it is difficult to maintain the dispersibility of a pigment in an ink. As such a dispersion synergist, a material having affinity with both a pigment and a polymer dispersant may be appropriately selected and used, and a dispersion synergist for an orange pigment, that for a violet pigment, and that for a blue pigment are, for example, as follows.

[Dispersion Synergist for Orange Pigment]

As a dispersion synergist for an orange pigment, an azo derivative is used. The azo derivative is a sulfonated derivative of an insoluble azo pigment. Because the azo derivative has a high polar portion derived from a sulfonic acid, it can sufficiently associate with a basic orange pigment having a high polar portion as well. Therefore, when an ink contains the azo derivative and the basic orange pigment, a relative decrease in the gellant molecules in the ink, caused by the accumulation of the gellant on the surface of the basic orange pigment, can be suppressed. Therefore, according to the ink containing the azo derivative and the basic orange pigment, it is thought that an image, having gloss that is not too high and having a color tone close to that of the orange described in Pantone (registered trademark) color sample book, can be formed.

The content of the azo derivative in the orange ink is 2% by mass or more and 15% by mass or less based on the total mass of the orange pigment. Because the basic orange pigment can sufficiently associate with the azo derivative when the content of the azo derivative is 2% by mass or more, it is thought that gloss does not become too high. When the content of the azo derivative is 15% by mass or less, a change in gloss, caused by the precipitation of the azo derivative on the surface of an image, can be suppressed. From the above viewpoint, the content of the azo derivative is preferably 5% by mass or more and 13% by mass or less based on the total mass of an ink, and more preferably 7% by mass or more and 12% by mass or less.

Examples of the azo derivative to be used as a dispersion synergist for the orange pigment include SOLSPERSE 22000 (manufactured by Lubrizol Corp.: "SOLSPERSE" is a registered trademark of the company) and BYK synergist 2105 (manufactured by BYK).

[Dispersion Synergist for Violet Pigment]

As a dispersion synergist for a violet pigment, an aqueous dye is used. An aqueous dye to be used as a dispersion synergist for a violet pigment is not particularly limited as long as it has affinity with a violet pigment having a dioxazine skeleton and has a hydrophilic moiety, and an aqueous dye having a carboxy group or a sulfonic acid group is preferable, and that having a sulfonic acid group is more preferable. It is thought that an aqueous dye having a hydrophilic moiety may perform acid-base interaction with a polymer dispersant and may have high affinity with a polymerizable compound, particularly with a high-polarity polymerizable compound having 6 or more ethylene oxide groups or propylene oxide groups. With such a compound, the dispersion stability of the violet pigment can be enhanced even if the affinity with the violet pigment having an oxazine skeleton is low.

Specific examples of the aqueous dye having a sulfonic acid group include Alizarin Astrol (manufactured by Tokyo Chemical Industry Co., Ltd.), Quinoline Yellow (manufactured by Sigma-Aldrich), Congo red dye derivative, Direct Blue 106 (manufactured by Tokyo Chemical Industry Co., Ltd.).

In addition, when the aqueous dye to be used as the dispersion synergist contains a dye having the same main skeleton as that of the violet pigment, the affinity with the pigment is enhanced, which is more preferable. Specifically, because the violet pigment is a compound having a dioxazine skeleton, it is preferable that the aqueous dye also contains a compound having the same dioxazine skeleton. When both the aqueous dye and the violet pigment have a dioxazine skeleton, π-bonded electrons interact with each other and the aqueous dye adsorbs to the surface of the pigment, and hence the pigment can be further stabilized. Therefore, the aqueous dye, having a sulfonic acid base and having the same dioxazine skeleton as that of the violet pigment, simultaneously has three properties including (1) a property of adsorbing to the surface of the violet pigment, (2) a property of performing acid-base interaction with the polymer dispersant, and (3) affinity with the high-polarity polymerizable compound; and hence it is thought that the aqueous dye may stably associate around the violet pigment and the polymer dispersant may adsorb around the aqueous dye, whereby the dispersion stability of the violet pigment can be enhanced.

As the aqueous dye having a sulfonic acid base and having the same dioxazine skeleton as that of the violet pigment, Direct Blue 106 can be further selected from among the above specific examples.

The content of the aqueous dye can be 2.0% by mass or more and 10.0% by mass or less based on the total mass of the violet pigment, more preferably 3.0% by mass or more and 7.5% by mass or less, and still more preferably 4.0% by mass or more and 6.0% by mass or less. When the content of the aqueous dye is 2% by mass or more, the effect of stabilizing the dispersibility of the violet pigment is exhibited. When the content of the aqueous dye is 10.0% by mass or less, most of the aqueous dye adsorbs to the surface of the violet pigment, so an increase in the viscosity of the ink, due to the aqueous dye floating in the ink, is less likely to occur. Also, when the ink contains the later-described gellant, it is thought that when the content of the aqueous dye is 10.0% by mass or less, association between the excessive aqueous dye and the gellant may never occur. It is thought that if the aqueous dye and the gellant associate with each other, the crystallization of the gellant may be inhibited and the pinning property of the ink is lowered, whereby the size of a droplet, occurring when the ink is printed, becomes large, which leads to a decrease in color density and a decrease in color gamut.

[Dispersion Synergist for Blue Pigment]

As a dispersion synergist for a blue pigment, one having a copper phthalocyanine structure is used. The dispersion synergist having a copper phthalocyanine structure exhibits affinity with a photopolymerizable compound, and suitably contributes to the dispersion of the above blue pigment with the copper phthalocyanine skeleton acting on the pigment. Examples of the dispersion synergist having a copper phthalocyanine structure include, for example: a copper phthalocyanine derivative obtained by introducing, as a substituent group, a polar group into a skeleton comprising copper phthalocyanine; and the like. When the dispersion synergist has a polar group, the function of stably dispersing the pigment in the photopolymerizable compound is improved.

Examples of the copper phthalocyanine derivative to be used as a dispersion synergist for the blue pigment include SOLSPERSE 5000 (manufactured by Lubrizol Corp.) and SOLSPERSE 12000 (manufactured by Lubrizol Corp.).

<Gellant>

The gellant is used for temporarily fixing (pinning) droplets of the ink landing on a recording medium by bringing the droplets into a gel state. When the ink is pinned in a gel state, wet spreading of the ink is suppressed and adjacent dots are less likely to coalesce with each other, and hence a higher-definition image can be formed. Also, when the ink is brought into a gel state, incorporation of oxygen into ink droplets is suppressed and curing inhibition by oxygen is less likely to occur, and hence a high-definition image can be formed at higher speed.

The gellant contained in each ink included in the ink set A and the ink set B contains at least one compound selected from among compounds represented by the following general formula (G1) and compounds represented by the following general formula (G2).

—CO—  General Formula (G1)

R3-COO—R4  General Formula (G2)

In the general formulae (G1) and (G2), R1 to R4 each independently represents a $C_{9-25}$ chain hydrocarbon group.

Only one of the gellants represented by the general formula (G1) and the gellants represented by the general formula (G2) may be contained in each ink, or both of them may be contained.

The content of the gellant as described above is preferably 1.0% by mass or more and 10.0% by mass or less based on the total mass of the ink. The pinning property of the ink can be enhanced by making the content of the gellant 1.0% by mass or more. In particular, when an image is formed on a recording medium having a high water absorption property, insufficient coloring due to penetration of the ink inside the recording medium can be suppressed, whereby an image having a desired color gamut can be easily formed. The ejection property of the ink from an ink head can be further enhanced by making the content of the gellant 10.0% by mass or less. Also, the gellant is less likely to precipitate on the surface of the formed image, whereby a difference in gloss between the respective inks, caused when an image is formed by the inks, can be reduced. From the above viewpoint, the content of the gellant in the ink is preferably 1.0% by mass or more and 7.0% by mass or less, more preferably 1.0% by mass or more and 5.0% by mass or less, and still more preferably 1.5% by mass or more and 4.0% by mass or less.

From the following viewpoint, the gellant is preferably crystallized in the ink at a temperature not higher than the gelation temperature of the ink. The gelation temperature refers to a temperature at which when the ink solated or liquefied by heating is cooled, the viscosity of the ink rapidly changes due to the phase transition of the gellant from sol to gel. Specifically, the solated or liquefied ink is cooled while the viscosity thereof is measured with a viscoelasticity measuring device (e.g., MCR300: manufactured by Physica), and the temperature at which the viscosity rapidly increases can be the gelation temperature of the ink.

When the gellant is crystallized in the ink, a structure may be formed in which the polymerizable compound is encapsulated in a three-dimensional space formed by the crystallized plate-shaped gellant. Such a structure is hereinafter referred to as a "card house structure". When the card house structure is formed, the liquid polymerizable compound is held in the three-dimensional space of the card house structure, and hence the wet spreading of the ink droplet is less likely to occur, and the pinning property of the ink is further enhanced. As the pinning property of the ink increases, the ink droplets landing on a recording medium are less likely to coalesce with each other, and hence a higher-definition image can be formed.

In order to form the card house structure, it is preferable that the polymerizable compound and the gellant that are dissolved in the ink are compatible with each other. On the other hand, if the polymerizable compound and the gellant that are dissolved in the ink are phase-separated from each other, the card house structure may be less likely to be formed.

The gellants represented by the general formula (G1) and those represented by the general formula (G2) are ones suitable for forming the card house structure by crystallization. In these gellants, the chain hydrocarbon group has 9 or more carbon atoms, and hence the crystallinity is further enhanced and a more sufficient space is formed in the card house structure. Therefore, the polymerizable compound is easily and sufficiently encapsulated in the space, whereby the pinning property of the ink is further enhanced. Also, the chain hydrocarbon group has 25 or less carbon atoms, and hence the melting point of the gellant does not become too high, so it is not necessary to excessively heat the ink when ejected. From the above viewpoint, it is particularly preferable that each of R1 to R4 is a $C_{11-22}$ linear hydrocarbon group.

From the viewpoint of raising the gelation temperature of the ink and turning the ink into a gel more rapidly after landing, it is preferable that either R1 or R2 or either R3 or R4 is a $C_{11-22}$ saturated hydrocarbon group. From the above viewpoint, it is more preferable that both R1 and R2 or both R3 and R4 are $C_{11-22}$ saturated hydrocarbon groups.

Examples of the ketone wax represented by the above general formula (G1) include dilignoceryl ketone (C: 23-24), dibehenyl ketone (C: 21-22), distearyl ketone (C: 17-18), diacosyl ketone (C: 19-20), dipalmityl ketone (C: 15-16), dimyristyl ketone (C: 13-14), dilauryl ketone (C: 11-12), lauryl myristyl ketone (C: 11-14), lauryl palmityl ketone (C: 11-16), myristyl palmityl ketone (C: 13-16), myristyl stearyl ketone (C: 13-18), myristyl behenyl ketone (C: 13-22), palmityl stearyl ketone (C: 15-18), valmityl behenyl ketone (C: 15-22), and stearyl behenyl ketone (C: 17-22). The number of carbon atoms in the parenthesis represents the number of carbon atoms in each of two hydrocarbon groups divided by a carbonyl group.

Examples of commercially available products of the ketone wax represented by the general formula (G1) include 18-Pentatriacontanon, Hentriacontan-16-on (both are manufactured by Alfa Aesar), and KAOWAX T1 (manufactured by Kao Corp.).

Examples of the fatty acid or ester wax represented by the general formula (G2) include behenyl behenate (C: 21-22), icosanoic acid icosyl (C: 19-20), stearyl stearate (C: 17-18), palmityl stearate (C: 17-16), lauryl stearate (C: 17-12), cetyl palmitate (C: 15-16), stearyl palmitate (C: 15-18), myristyl myristate (C: 13-14), cetyl myristate (C: 13-16), octyldodecyl myristate (C: 13-20), stearyl oleate (C: 17-18), stearyl erucate (C: 21-18), stearyl linoleate (C: 17-18), behenyl oleate (C: 18-22), and arachidyl linoleate (C: 17-20). The number of carbon atoms in the parenthesis represents the number of carbon atoms in each of two hydrocarbon groups divided by a carbonyl group.

Examples of commercially available products of the ester wax represented by the general formula (G2) include UNISTAR-M-2222SL and SPERMACETI (manufactured by NOF Corp.: "UNISTAR" is a registered trademark of the company), EXCEPARL SS and EXCEPARL MY-M (manufactured by KAO Corp.: "EXCEPARL" is a registered trademark of the company), EMALEX CC-18 and EMALEX CC-10 (manufactured by Nippon Emulsion Co., Ltd.: "EMALEX" is a registered trademark of the company), AMREPS PC (manufactured by KOKYU ALCOHOL KOGYO CO., LTD.: "AMREPS" is a registered trademark of the company), and WE11 (manufactured by NOF CORP.). Because these commercially available products are often a mixture of two or more types, they may be contained in the ink after being separated and refined, if necessary.

<Polymerizable Compound>

The polymerizable compound can be polymerized by being irradiated with active rays, whereby can cure the ink. Examples of the active rays include ultraviolet rays, electron beams, α-rays, γ-rays, and X-rays. From the viewpoint of safety and from the viewpoint that the polymerizable compound can be polymerized even with a low energy consumption, the active rays are preferably ultraviolet rays or electron beams.

The polymerizable compound contains the later-described high-polarity polymerizable compound. The polymerizable compound may further contain a polymerizable compound that exhibits a lower polarity than the high-polarity polymerizable compound (hereinafter also simply referred to as a "low-polarity polymerizable compound").

The total content of the high-polarity polymerizable compound and the low-polarity polymerizable compound may be within a range in which the ink irradiated with the active rays is sufficiently cured, and, for example, the content can be 1% by mass or more and 97% by mass or less based on the total mass of the ink. From the above viewpoint, the content of the polymerizable compound is preferably 30% by mass or more and 95% by mass or less based on the total mass of the ink.

In addition to the above polymerizable compounds, the polymerizable compound includes a radically polymerizable compound or a cationically polymerizable compound. From the viewpoint that polymerization and crosslinking are likely to occur and various compounds can be selected in accordance with an image to be formed, the polymerizable compound is preferably a radically polymerizable compound.

The radically polymerizable compound is a compound having a radically polymerizable ethylenically unsaturated bond. The radically polymerizable compound may be any one of a monomer, a polymerizable oligomer, a prepolymer, or a mixture thereof. Only one type of the radically polymerizable compounds may be contained in the ink, or two or more types may be contained.

Examples of the compounds having a radically polymerizable ethylenically unsaturated bond include unsaturated carboxylic acids and salts thereof, unsaturated carboxylic acid ester compounds, unsaturated carboxylic acid urethane compounds, unsaturated carboxylic acid amide compounds and anhydrides thereof, acrylonitrile, styrene, unsaturated polyesters, unsaturated polyethers, unsaturated polyamides, unsaturated urethanes, and the like. Examples of the unsaturated carboxylic acids include (meth)acrylic acid, itaconic acid, crotonic acid, isocrotonic acid, maleic acid, and the like.

Among them, the radically polymerizable compound is preferably an unsaturated carboxylic acid ester compound, and more preferably (meth)acrylate. In the present invention, "(meth) acrylate" means acrylate or methacrylate, a "(meth) acryloyl group" means an acryloyl group or a methacryloyl group, and "(meth)acryl" means acryl or methacryl.

[High-Polarity Polymerizable Compound]

The high-polarity polymerizable compound is a polymerizable compound having 6 or more ethylene oxide groups (hereinafter also simply referred to as "EO groups") or propylene oxide groups (hereinafter also simply referred to as "PO groups"). Only one type of the high-polarity polymerizable compounds may be contained in the ink, or two or more types may be contained. Although not particularly limited, it is preferable that the total number of the EO groups or the PO groups in the high-polarity polymerizable compound is 30 or less.

Six or more EO groups or PO groups may exist as one linked segment or exist separately in two or more segments. However, from the viewpoint of further enhancing the dispersion stability of the pigment during storage and emission, it is preferable that when the EO groups or PO groups exist separately in two or more segments, two or more segments each having three or more EO groups or PO groups exist in the molecule.

The high-polarity polymerizable compound as described above has high affinity with the pigment, and hence the dispersibility of the pigment in the polymerizable compound can also be enhanced. For example, the orange pigment having a basic moiety has polarity, and hence it has high affinity with the high-polarity polymerizable compound. Also, the high-polarity polymerizable compound has high affinity with the organic acid residue (preferably abietic acid residue) in the green pigment having a copper phthalocyanine structure. Further, the high-polarity polymerizable compound has high affinity with the condensed ring (thick π electron groups) contained in the violet pigment having a dioxazine skeleton.

Similarly, the high-polarity polymerizable compound has high affinity with a constituent unit having hydrophilicity in the polymer dispersant. Further, the high-polarity polymerizable compound has high affinity with the dispersion synergist for the orange pigment using an azo derivative containing a polar moiety. Thereby, the high-polarity polymerizable compound can enhance the dispersibility of the polymer dispersant and the dispersion synergist in the polymerizable compound.

Thereby, the high-polarity polymerizable compound has a high ability to disperse the pigment even at a temperature higher than 60° C. that is a heating temperature at which the ink is ejected from the ink head in the ink-jet recording apparatus, and hence ink clogging, due to precipitation of the pigment during the emission, can be suppressed.

Also, the high-polarity polymerizable compound has high affinity with the pigment, and hence the pigment is more strongly attracted to the high-polarity polymerizable compound than to the gellant, whereby trapping of the gellant by the pigment is less likely to occur. Thereby, the pinning property of the ink by the gellant is enhanced, and hence when an image is formed particularly on a water-absorbing recording medium, insufficient coloring due to penetration of the ink inside the recording medium can be suppressed, whereby an image having a desired color gamut can be easily formed.

From the viewpoint of sufficiently exhibiting the above effects, the content of the high-polarity polymerizable compound is 25% by mass or more based on the total mass of the polymerizable compound, preferably 35% by mass or more and 75% by mass or less, and more preferably 45% by mass or more and 65% by mass or less.

Examples of commercially available products of the high-polarity polymerizable compounds include the products listed in Table 1. In Table 1, "the number of EO groups or PO groups" represents the number of EO groups or PO groups contained in one molecule of the product represented by the brand name. In Table 1, "New Frontier" is a registered trademark of DKS Co., Ltd., and "FANCRYL" is a registered trademark of Hitachi Chemical Co., Ltd.

2-(meth)acryloyloxyethyl hexahydrophthalic acid, butoxyethyl(meth)acrylate, ethoxydiethylene glycol(meth)acrylate, methoxydiethylene glycol(meth)acrylate, methoxypolyethylene glycol(meth)acrylate, methoxypropylene glycol (meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, 2-(meth)acryloyloxyethyl succinic acid, 2-(meth)acryloyloxyethyl phthalic acid, 2-(meth)acryloyloxyethyl-2-hydroxyethylphthalic acid, and t-butylcyclohexyl(meth)acrylate.

Examples of the difunctional (meth)acrylate include triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, PO adduct di(meth)acrylate of bisphenol A, hydroxypivalate neopentyl glycol di(meth)acrylate, polytetramethylene glycol di(meth)acrylate, polyethylene glycol diacrylate, and tripropylene glycol diacrylate.

Examples of the trifunctinal or higher (meth)acrylate include trimethylolpropane tri(meth)acrylate, pentaerythri-

TABLE 1

| Manufacturer name | Brand name | Compound name | Number of EO groups or PO groups |
|---|---|---|---|
| Shin-Nakamura Chemical Co., Ltd. | A-400 | Polyethylene glycol 400 diacrylate | 9 |
| Shin-Nakamura Chemical Co., Ltd. | A-600 | Polyethylene glycol 600 diacrylate | 14 |
| DKS Co., Ltd. | New Frontier BPE-10 | EO-modified bisphenol A diacrylate | Approximately 10 |
| DKS Co., Ltd. | New Frontier BPE-20 | EO-modified bisphenol A diacrylate | Approximately 20 |
| DKS Co., Ltd. | New Frontier MPE-600 | Methoxy polyoxyethylene glycol acrylate | Approximately 13 |
| DKS Co., Ltd. | New Frontier N-177E | EO-modified nonylphenol acrylate | 16-17 |
| DKS Co., Ltd. | New Frontier PE-400 | Polyethylene glycol 400 diacrylate | Approximately 9 |
| DKS Co., Ltd. | New Frontier PE-600 | Polyethylene glycol 600 diacrylate | Approximately 13 |
| DAICEL-ALLNEX LTD. | PEG400DA-D | Polyethylene glycol 400 diacrylate | Approximately 9 |
| Hitachi Chemical Co., Ltd. | FANCRYL FA-240A | Polyethylene glycol 400 diacrylate | Approximately 7 |
| Hitachi Chemical Co., Ltd. | FANCRYL FA-240M | Polyethylene glycol 400 di(meth)acrylate | Approximately 7 |
| Hitachi Chemical Co., Ltd. | FANCRYL FA-318A | Nonylphenoxy polyethylene glycol acrylate | Approximately 8 |
| Hitachi Chemical Co., Ltd. | FANCRYL FA-137M | EO-modified trimethylolpropane tri(meth)acrylate | 21 |
| Hitachi Chemical Co., Ltd. | FANCRYL FA-400M | Methoxy polyethylene glycol 400 methacrylate | Approximately 9 |

[Low-Polarity Polymerizable Compound]

The low-polarity polymerizable compound is a polymerizable compound in which the total number of EO groups and PO groups is less than 6.

Examples of the low-polarity polymerizable compound that is (meth)acrylate include monofunctional (meth)acrylate, difunctional (meth)acrylate, and trifunctional or higher (meth)acrylate.

Examples of the monofunctional (meth)acrylate include isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethylhexyldiglycol(meth)acrylate, 2-hydroxybutyl(meth)acrylate, tol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate.

Examples of the low-polarity polymerizable compound having a polar structure include the products listed in the following Table 2. In Table 2, "the number of EO groups or PO groups" represents the number of EO groups or PO groups contained in one molecule of the product represented by the brand name. In Table 2, "ARONIX" is a registered trademark of TOAGOSEI Co., Ltd., and "Miramer" is a registered trademark of Miwon Specialty Chemical Co., Ltd.

TABLE 2

| Manufacturer name | Brand name | Compound name | Number of EO groups or PO groups |
|---|---|---|---|
| DKS Co., Ltd. | New Frontier BPP-4 | PO-modified bisphenol A diacrylate | Approximately 4 |
| DKS Co., Ltd. | New Frontier HBPE-4 | EO modified hydrogenated bisphenol A diacrylate | Approximately 4 |

TABLE 2-continued

| Manufacturer name | Brand name | Compound name | Number of EO groups or PO groups |
|---|---|---|---|
| DKS Co., Ltd. | New Frontier HDDA | 1,6-hexanediol diacrylate | 1 |
| DKS Co., Ltd. | New Frontier L-C9A | 1,9-nonanediol diacrylate | 1 |
| DKS Co., Ltd. | New Frontier TEICA | Tri(acryloxyethyl)isocyanurate | 3 |
| DKS Co., Ltd. | New Frontier TMP-3P | PO-modified trimethylolpropane triacrylate | Approximately 3 |
| DKS Co., Ltd. | New Frontier TMPT | Trimethylolpropane triacrylate | 3 |
| DAICEL-ALLNEX LTD. | ERECRYL 110 | Ethoxylated phenyl acrylate | 2 |
| DAICEL-ALLNEX LTD. | IBOA-B | Isobornyl acrylate | 0 |
| DAICEL-ALLNEX LTD. | ODA-N | Octyl/decyl acrylate | 1 |
| TOAGOSEI Co., Ltd. | Aronix M 220 | Tripropylene glycol diacrylate | Approximately 3 |
| Miwon Specialty Chemical Co., Ltd. | Miramer M360 | Trimethylolpropane 3PO-modified triacrylate | 3 |
| Hitachi Chemical Co., Ltd. | FANCRYL FA-220M | Polyethylene glycol 200 dimethacrylate | Approximately 4 |
| Hitachi Chemical Co., Ltd. | FANCRYL FA-512M | Dicyclopentenyloxyethyl methacrylate | 1 |
| Hitachi Chemical Co., Ltd. | FANCRYL FA-513AS | Dicyclopentenyl acrylate | 0 |
| Hitachi Chemical Co., Ltd. | FANCRYL FA-BZA | Benzyl acrylate | 0 |
| Hitachi Chemical Co., Ltd. | FANCRYL FA-PTG9A | Polytetramethylene glycol diacrylate | 0 |

<Polymerization Initiator>

When the polymerizable compound is a compound having a radically polymerizable functional group, the polymerization initiator is a photo-radical initiator, and when the polymerizable compound is a compound having a cationically polymerizable functional group, the polymerizable compound is a photoacid generator. Only one type of the polymerization initiators may be contained in the ink, or two or more types may be contained. The polymerization initiator may be a combination of both a photo-radical initiator and a photoacid generator.

The photo-radical initiator includes a cleavage type radical initiator and a hydrogen abstraction type radical initiator.

Examples of the cleavage type radical initiator include an acetophenone-based initiator, a benzoin-based initiator, an acylphosphine oxide-based initiator, benzyl, and methylphenylglyoxyester.

Examples of the acetophenone-based initiator include diethoxyacetophenone, 2-hydroxy-2-methyl-1-phenylpropane-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl phenyl ketone, 2-methyl-2-morpholino(4-thiomethylphenyl)propan-1-one, and 2-benzyl-2-dimethylamino-1-(4-morpholinophenyl)-butanone.

Examples of the benzoin-based initiator include benzoin, benzoin methyl ether, and benzoin isopropyl ether.

Examples of the acylphosphine oxide-based initiator include 2,4,6-trimethylbenzoin diphenylphosphine oxide.

Examples of the hydrogen abstraction type radical initiator include a benzophenone-based initiator, a thioxanthone-based initiator, an aminobenzophenone-based initiator, 10-butyl-2-chloroacridone, 2-ethyl anthraquinone, 9,10-phenanthrenequinone, and camphorquinone.

Examples of the benzophenone-based initiator include benzophenone, methyl o-benzoylbenzoate-4-phenylbenzophenone, 4,4'-dichlorobenzophenone, hydroxybenzophenone, 4-benzoyl-4'-methyl-diphenylsulfide, acrylated benzophenone, 3,3',4,4'-tetra (t-butylperoxycarbonyl) benzophenone, and 3,3'-dimethyl-4-methoxybenzophenone.

Examples of the thioxanthone-based initiator include 2-isopropylthioxanthone, 2,4-dimethylthioxanthone, 2,4-diethylthioxanthone, and 2,4-dichlorothioxanthone.

Examples of the aminobenzophenone-based initiator include Michler's ketone and 4,4'-diethylaminobenzophenone.

Examples of the photoacid generator include the compounds described in "Organic Materials for Imaging" edited by the Japanese Research Association for Organic Electronics Materials, Bunshin Publishing (1993), pages 187-192.

The content of the polymerization initiator may be within a range where the ink can be sufficiently cured, and can be, for example, 0.01% by mass or more and 10% by mass or less based on the total mass of the ink.

<Other Materials>

Examples of other materials contained in each ink include a polymerization initiator aid, a polymerization inhibitor, and further, a surfactant, a stabilizer, and the like. These materials are contained in each ink within a range where the advantages of the present embodiment can be obtained. Only one type of each of these materials may be contained in the ink, or two or more types may be contained.

Examples of the polymerization initiator aid include a tertiary amine compound including an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine, and N,N-dimethylhexylamine.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropyl phenol, butyraldoxime, methylethyl ketoxime, and cyclohexanone oxime.

<Physical Properties of Ink>

From the viewpoint of further enhancing the ejection property of each ink from the ink head in an ink-jet recording apparatus, the viscosity of the ink at a heating temperature (e.g., 80° C.) at the time of the ejection is preferably 3 mPa·s or more and 20 mPa·s or less. Also, from the viewpoint of enhancing the gelation upon landing on a recording medium and being cooled to normal temperature, the viscosity of each ink at room temperature (25° C.) is preferably 1000 mPa·s or more.

The gelation temperature of each ink is preferably 40° C. or higher and 70° C. or lower. When the gelation temperature of the ink is 40° C. or higher, the ink rapidly gels after landing on a recording medium, and hence the pinning property is further enhanced. When the gelation temperature of the ink is 70° C. or lower, the ink hardly gels at the heating temperature (e.g, 80° C.) at the time of the ejection from the ink head, and hence the ink can be ejected more stably.

The viscosity of each ink at 80° C., and the viscosity and gelation temperature thereof at 25° C. can be determined by measuring, with a rheometer, temperature changes in the dynamic viscoelasticity of the ink.

Specifically, these viscosities and gelation temperature can be obtained by the following method. A temperature change curve of viscosity is obtained by heating each ink to 100° C. and then cooling it to 20° C. under conditions in which a shear rate is 11.7 (1/s), and a cooling rate is 0.1° C./s, while measuring the viscosity with a stress control-type rheometer (e.g., Physica MCR301 (diameter of the cone plate: 75 mm, cone angle: 1.0°), manufactured by Anton Paar). The viscosities at 80° C. and at 25° C. can be determined by respectively reading the viscosities at 80° C. and 25° C. in the temperature change curve of viscosity. The gelation temperature can be determined as the temperature at which the viscosity becomes 200 mPa·s in the temperature change curve of the viscosity.

<Manufacturing Method of Ink>

Each ink can be obtained, for example, by mixing the pigment, the polymer dispersant, if necessary, the dispersion synergist, the gellant, the polymerizable compound, the polymerization initiator, and other necessary materials under heating. It is preferable to filter the obtained mixture with a predetermined filter. Alternatively, each ink may be obtained as follows, in which: a pigment dispersion, in which the pigment, the polymer dispersant, and the dispersion synergist are dispersed in part of the polymerizable compound, is prepared in advance; and the remaining components are added thereto and mixed under heating.

The pigment, the polymer dispersant, the dispersion synergist, and the polymerizable compound can be dispersed, for example, by a ball mill, a sand mill, an attritor, a roll mill, an agitator, a Henschel mixer, a colloid mill, an ultrasonic homogenizer, a pearl mill, a wet jet mill, and a paint shaker.

<<Ink-Jet Recording Method>>

Next, an ink-jet recording method using the ink sets of the above embodiment will be described. This ink-jet recording method includes the following three steps:

(a) a step of landing, on a recording medium, each droplet of the process color inks of the ink set A, that is, the yellow ink, the magenta ink, the cyan ink, and the black ink, by ejecting each droplet from an ink head;

(b) a step of landing, on the recording medium, each droplet of at least two colors among the special color inks of the ink set B, that is, the orange ink, the green ink, the violet ink, and the blue ink, by ejecting each droplet from an ink head; and (c) a step of curing the droplet of each ink landing on the recording medium by irradiating with active rays.

It is preferable to perform (a) the step of landing the process color inks of the ink set A on a recording medium and (b) the step of landing the special color inks of the ink set B on the recording medium, in a line recording system (single pass recording system) in which the respective color inks are sequentially supplied from the ink heads for the respective inks, the ink heads being arranged along the conveying direction of a recording medium, to a recording medium to be conveyed.

Either of these steps (a) and (b) may be performed first, and the feeling of gloss of an image to be formed can be enhanced by embedding the droplets of each ink between the droplets. However, when (a) the step of landing the process color inks is performed first, the feeling of gloss of an image to be formed is further enhanced.

(c) The step of curing each droplet may be performed in only one step or in two steps. For example, the following procedures may be adopted in which: after the step (a), the first step (c) is performed to cure the droplets of the process color inks; and after the step (b), the second step (c) is performed to cure the droplets of the special color inks.

Next, details of each of the above steps (a) to (c) will be described.

<Steps (a) and (b)>

In the steps (a) and (b), the droplet of each ink is allowed to land at a position of a recording medium corresponding to an image to be formed by ejecting the droplet from an ink head.

The ejection stability of the droplets of each ink can be enhanced by ejecting, from the ink head, them in a heated state. The temperature of each ink, when it is ejected from the ink head, is preferably set as follows, in which the temperature of the ink, when it is loaded in the ink head, is higher than the gelation temperature of the ink by approximately 10° C. to 30° C. If the temperature of the ink in the ink head is higher than the gelation temperature by less than 10° C., the ink may gel in the ink head or on the nozzle surface, whereby the ejection property of the ink is likely to decrease. On the other hand, if the temperature of the ink inside the ink head is higher than the gelation temperature by more than 30° C., the ink becomes too hot, whereby the ink components may deteriorate.

The amount of the droplets of each ink ejected from the ink head is preferably 2 pL or more and 20 pL or less in view of recording speed and image quality.

The conveying speed of a recording medium is preferably from 30 m/min to 120 m/min, and more preferably 45 m/min or higher and 120 m/min or lower. Higher conveying speed of a recording medium is preferable because image forming speed becomes higher, but if the conveying speed is too high, the image quality may deteriorate or the photocuring (described later) of each color ink may become insufficient. Within this range, good productivity and good image quality can be achieved at the same time.

It is preferable that the temperature of a recording medium, when the droplets of each ink are to be allowed to land, is set to be 10 to 20° C. lower than the gelation temperature of the ink, and the temperature is approximately 20° C. to 40° C. If the temperature of a recording medium is too low, pinning progresses rapidly due to the rapid gelation of the ink droplets, whereby mutual embedding among the ink droplets becomes insufficient. On the other hand, if the temperature of a recording medium is too high, the ink droplets are less likely to gel, whereby adjacent dots of the ink droplets may be mixed with each other. Appropriate leveling and appropriate pinning, to the extent that adjacent dots of the ink droplets are not mixed with each other, can be achieved by appropriately adjusting the temperature of a recording medium.

Herein, in the step (a) of landing the droplets of each process color ink of the ink set A and the step (b) of landing the droplets of each special color ink of the ink set B, the temperature of the recording medium may be set to the same temperature, and even if the recording medium is at the same temperature, the droplets of each ink are sufficiently leveled.

<Step (c)>

In the step (c), each ink landing on the recording medium in the steps (a) and (b) is cured by irradiating with active rays. It is preferable that the active rays are emitted in 0.001 seconds or more and 1.0 second or less after each ink lands, and more preferable that they are emitted in 0.001 seconds or more and 0.5 seconds or less in order to form a high-definition image.

The active rays to be emitted to each ink can be selected from, for example, among electron beams, ultraviolet rays, α-rays, γ-rays, X-rays, and the like, but among them, ultraviolet rays are preferably emitted. As the ultraviolet rays, ultraviolet rays, having a wavelength of 395 nm and using a water-cooled LED (manufactured by Phoseon Technology) as a light source, can be used. Occurrence of poor curing of each ink, due to the melting of the ink by the radiant heat of a light source, can be suppressed by using an LED as a light source.

The LED light source is installed such that the peak illuminance of the active rays having a wavelength of 370 nm or more and 410 nm or less on the image surface is 0.5 W/cm$^2$ or more and 10 W/cm$^2$ or less, and is more preferably installed such that the peak illuminance is 1 W/cm$^2$ or more and 5 W/cm$^2$ or less. From the viewpoint of suppressing the irradiation of each ink with radiant heat, it is preferable that the amount of light irradiated to an image is less than 350 mJ/cm$^2$.

Alternatively, the irradiation of active rays may be divided into two stages in which: each ink is temporarily cured by irradiating with active rays in 0.001 seconds or more and 2.0 seconds or less after the ink lands according to the above method; and the ink is finally cured by further irradiating with active rays after all the printing is finished. Shrinkage of a recording material, which may be caused when an ink is cured, is less likely to occur by dividing the irradiation of active rays into two stages.

In this ink-jet recording method, occurrence of curling and wrinkling of a recording medium, a change in the texture of the recording medium, and the like can be prevented more efficiently by setting the total ink film thickness, obtained after each ink landing on the recording medium is cured by irradiating with active rays, to be 2 μm or more and 20 μm or less. Herein, "the total ink film thickness" means the sum of the film thicknesses of all the inks applied to or printed on a recording medium, or the average value of the above sums of the film thicknesses measured at a plurality of spots each expected to have a large ink landing amount.

The step (c) is performed after the steps (a) and (b), or both after the step (a) and after the step (b).

<Recording Medium>

The recording medium to be used in this recording method may be any one as long as an image is formed by the ink sets, and examples thereof include, for example: non-absorbent recording media (plastic substrates) made of plastic such as polyester, polyvinyl chloride, polyethylene, polyurethane, polypropylene, acrylic resin, polycarbonate, polystyrene, acrylonitrile-butadiene-styrene copolymer, polyethylene terephthalate, or polybutadiene terephthalate; non-absorbent inorganic recording media made of metals, glass, or the like; and absorbent paper (e.g., plain paper, coated paper for printing, and boxboard). Also, an image with high color gamut reproducibility can be formed even on a recording media having a thickness of 0.6 mm or more (boxboard, microflute cardboard).

<Ink-Jet Recording Apparatus>

Figure 2:
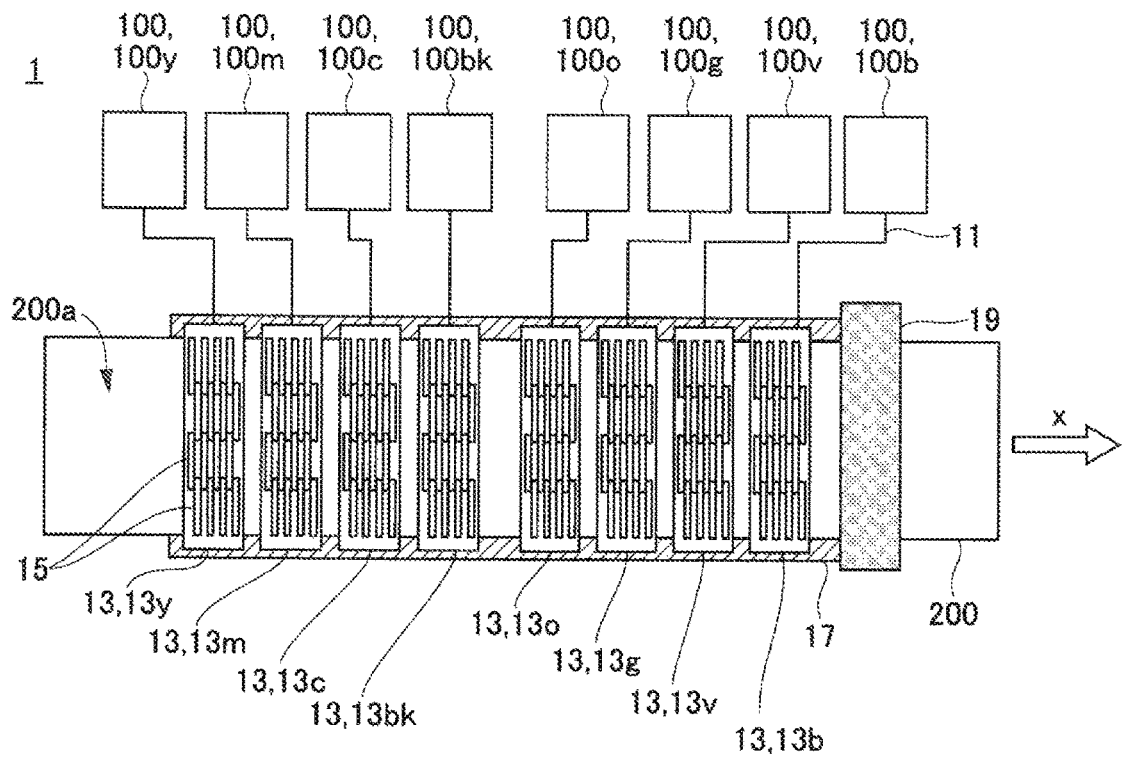
FIG. 2 is a plan view illustrating a configuration example of the recording apparatus for implementing the ink-jet recording method according to the embodiment.

Next, the configuration of an ink-jet recording apparatus for carrying out the ink-jet recording method using the ink sets of the above embodiment will be described. FIG. 1 is a side view illustrating the configuration of a recording apparatus according to an embodiment. FIG. 2 is a plan view illustrating the configuration of the ink-jet recording apparatus according to the embodiment.

An ink-jet recording apparatus 1 of an embodiment illustrated in these figures is of an active ray curing type line recording system (single pass recording system). In this ink-jet recording apparatus 1, a plurality of storage tanks 100, in which inks of respective colors composing the ink sets are respectively stored, are installed. The storage tanks 100 include a yellow ink storage tank 100y, a magenta ink storage tank 100m, a cyan ink storage tank 100c, and a black ink storage tank 100bk, which respectively store the process color inks composing the ink set A. The storage tanks 100 also include at least two of an orange ink storage tank 100o, a green ink storage tank 100g, a violet ink storage tank 100v, and a blue ink storage tank 100b, which respectively store the special color inks composing the ink set B. In the figures, an example is illustrated in which storage tanks for the four special colors are installed, but another configuration may be adopted in which only storage tanks for, among them, two or three colors are installed.

The ink-jet recording apparatus 1 includes a conveying mechanism (not illustrated) for conveying a recording medium 200. The ink-jet recording apparatus 1 also includes an ink flow path 11, a head carriage 13, and an ink head 15, which are to be connected to each storage tank 100. The ink-jet recording apparatus 1 further includes a temperature control unit 17 and a light emission unit 19.

Among them, the conveying mechanism for conveying the recording medium 200 conveys the recording medium 200 in a predetermined conveying direction x with an image forming surface 200a of the recording medium 200 facing in a predetermined direction.

The ink flow path 11 is provided between each storage tank 100 and a plurality of the ink heads 15 to supply the ink stored in each storage tank 100 to the ink heads 15.

The head carriage 13 houses the plurality of the ink heads 15 connected to each storage tank 100 collectively for each of the connected storage tanks 100. That is, the head carriages 13 includes a head carriage 13y for the yellow ink, a head carriage 13m for the magenta ink, a head carriage 13c for the cyan ink, and a head carriage 13bk for the black ink, these inks being included in the ink set A. The head carriages 13 also include at least two of a head carriage 13o for the orange ink, a head carriage 13g for the green ink, a head carriage 13v for the violet ink, and a head carriage 13b for the blue ink, these inks being included in the ink set B. In the figures, the case where head carriages for the four special colors are provided is illustrated, but another configuration may be adopted in which only head carriages for, among them, two or three special colors are installed.

These head carriages 13 face the image forming surface 200a of the recording medium 200, and are arranged along the conveying direction x of the recording medium 200. The head carriages 13 are arranged such that, for example, the head carriages 13y, 13m, 13c, and 13bk for the ink set A are arranged in an arbitrary order on the upstream side in the conveying direction x of the recording medium 200. The head carriages 13o, 13g, 13v, and 13b for the ink set B are arranged in an arbitrary order on the downstream side in the conveying direction x of the recording medium 200. Herein, the head carriages 13 may be arranged in reverse, that is, the head carriages 13o, 13g, 13v, and 13b for the ink set B may be arranged on the upstream side of the head carriages 13y, 13m, 13c, and 13bk for the ink set A.

Each head carriage 13 has a size by which the entire width (the width in the direction perpendicular to the conveying direction x) of the recording medium 200 is covered, and holds the plurality of the ink heads 15 housed therein such that the ink heads face the entire width of the recording medium 200 at a predetermined density.

The ink head 15 is used to eject each ink stored in the storage tank 100 toward the recording medium 200. An ejection system for such an ink head may be either an on-demand system or a continuous system. The ink head of an on-demand system may be any one of: ink heads of an electro-mechanical conversion system such as a single cavity type, a double cavity type, a bender type, a piston type, a share mode type, and a shared wall type; ink heads of an electro-thermal conversion system such as a thermal ink-jet type or a Bubble Jet ("Bubble Jet" is a registered trademark of Canon Inc.) type; and the like.

Although not illustrated here, heating devices for heating the ink ejected from the ink head 15 to a predetermined temperature are provided in the ink head 15 and an ink supply path extending from the storage tank 100 to the ink head 15. Examples of the heating device include devices using, for example, a panel heater, a ribbon heater, warm water, or the like.

The temperature control unit 17 is used to adjust the temperature of the recording medium 200, and is arranged at a position sandwiching the recording medium 200 with the head carriage 13. Such a temperature control unit 17 is arranged to have a width extending over the entire width (the width in the direction perpendicular to the conveying direction x) of the recording medium 200 and a length facing all the head carriages 13 and reaching the light emission unit 19.

Herein, the temperature control unit 17 adjusts the temperature of the recording medium 200 to cool the droplets of each ink, ejected from the ink head 15 in a heated state and landing on the recording medium 200, to a temperature lower than the gelation temperature of each ink by 10° C. to 20° C. The gelation temperature of each ink is preferably 40° C. or higher and 70° C. or lower. Accordingly, as the temperature control unit 19, various heaters or cooling devices that can adjust the temperature of the recording medium 200 within the range of normal temperature to a temperature higher than normal temperature (e.g., within the range of approximately 20° C. to 40° C.) are used.

The light emission unit 19 is used to cure each ink that gelled after landing on the recording medium 200. The light emission unit 19 is arranged, on the image forming surface 200a side of the recording medium 200 to be conveyed in the predetermined conveying direction x, on the downstream side in the conveying direction x of the head carriage 13, and is configured to emit active rays to the entire width (the width in the direction perpendicular to the conveying direction x) of the recording medium 200. As such a light emission unit 19, for example, an LED light source is used.

Alternatively, the light emission unit 19 may be additionally provided between the head carriages 13y, 13m, 13c, and 13bk for the ink set A and the head carriages 13o, 13g, and 13v for the ink set B. Thereby, the droplets of the process color inks composing the ink set A and those of the special color inks composing the ink set B can be separately cured.

As the ink-jet recording method using the ink sets described in the embodiment, a method has been described above, in which an ink-jet recording apparatus of an active ray curing type line recording system (single pass recording system) is used. In the ink-jet recording method using the ink sets described in the embodiment, however, an ink-jet recording apparatus of a serial recording system may be used as long as it is an active ray curing type.

Examples

Hereinafter, the present invention will be described in more detail with reference to examples, but the scope of the invention is not limited by these descriptions.

<<Preparation of Pigment Dispersion>>

<Procedure for Preparing Pigment Dispersions 1 to 10 and 14 to 16>

Pigment dispersions 1 to 10 and 14 to 16 to be used for the ink sets of Examples and Comparative Examples were prepared by combining the materials shown in the following Table 3 in the following procedure. First, a polymer dispersant (9 parts by mass) and a polymerizable compound (71 parts by mass) were placed in a stainless steel beaker and heated and stirred for 1 hour while being heated on a 65° C. hot plate. After cooled to room temperature, the stirred mixture was placed in a 200 ml plastic bottle, and pigments (20 parts by mass) and 120 g of zirconia beads having a diameter of 0.5 mmφ were added and the lid was tightened, and then this mixture was dispersed for 5 hours by a vibration mill (Red Devil 4500L, manufactured by Nishimura Seisakusho Co., Ltd.). A dispersion was taken out by separating the beads from the dispersed mixture, whereby 20% by weight of each of the pigment dispersions 1 to 10 and 14 to 16 was obtained.

<Procedure for Preparing Pigment Dispersions 11 to 13>

Pigment Dispersions 11 to 13 to be used in the ink sets of Examples were obtained in the same manner as in Pigment Dispersions 1 to 10 and 14 to 16, except that the dispersion synergists (0.1 parts by mass) shown in the following Table 3 were additionally added to the above 200 ml plastic bottle.

<Procedure for Preparing Pigment Dispersions 17 to 19>

Stainless steel shots (1200 g) having a diameter of ⅛ inch, a pigment (30 g) shown in Table 3, a polymer dispersing agent (18 g), and a polymerizable compound (152 g) were placed in a 1-liter attritor and mixed. The mixture was stirred and dispersed at 400 RPM for 18 hours. Next, a dispersion was taken out by separating the stainless steel shot from the mixture, whereby 15% by weight of each of the pigment dispersions 17 to 19 was obtained.

TABLE 3

| Pigment dispersion No. | Pigment | Polymer dispersant | Dispersion synergist (Sy) | Remarks |
| --- | --- | --- | --- | --- |
| 1 (Yellow) | PY185 | EFKA7701 | — | |
| 2 (Magenta) | PV19:PR202 | BYK jet9151 | — | |
| 3 (Cyan) | PB15:4 | BYK jet9151 | — | |
| 4 (Black) | PBk7 | BYK jet9151 | — | |
| 5 (Orange) | PO64 | EFKA7701 | — | |
| 6 (Orange) | PO71 | EFKA7701 | — | |

TABLE 3-continued

| Pigment dispersion No. | Pigment | Polymer dispersant | Dispersion synergist (Sy) | Remarks |
|---|---|---|---|---|
| 7 (Violet) | PV23 | EFKA7701 | — | |
| 8 (Violet) | PV37 | EFKA7701 | — | |
| 9 (Green) | PG36 | BYK jet9151 | — | |
| 10 (Green) | PG7 | BYK jet9151 | — | |
| 11* (Orange) + (Sy) | PO64 | EFKA7701 | sol22000 | |
| 12* (Violet) + (Sy) | PV23 | EFKA7701 | AY3 | |
| 13* (Blue) + (Sy) | PB60 | TEGO Dispers685 | sol5000 | |
| 14 (Orange) | PO43 | EFKA7701 | — | Comparative special color pigment |
| 15 (Violet) | PV29 | EFKA7701 | — | |
| 16 (Green) | PG50 | BYK jet9151 | — | |
| 17 (Orange) | PO36 | EFKA4340 | — | |
| 18 (Violet) | PV23 | EFKA4340 | — | |
| 19 (Green) | PG7 | EFKA4340 | — | |

The materials shown in Table 3 and the polymerizable compounds used as described above are as follows.
<Pigments>
[For Ink Set A]
 Yellow Pigment . . . PY185 (manufactured by BASF: D1155)
 Magenta Pigment . . . PV19: PR202 mixed crystal (manufactured by BASF: Cinquasia Red K4330: PV19/PR 202 ratio: 80/20)
 Cyan Pigment . . . PB15: 4 (manufactured by Dainichiseika Color & Chemicals Mfg. Co., Ltd: Chromofine Blue 6332JC)
 Black Pigment . . . PBk7 (manufactured by Mitsubishi Chemical Corporation: #52)
[For Ink Set B (Pigments of Examples)]
 Orange Pigment . . . PO64 (manufactured by BASF: ORANGE K 2960)
 Orange Pigment . . . PO71 (manufactured by BASF: IRGAZIN ORANGE D2905)
 Orange Pigment . . . PO36 (manufactured by CLARIANT: Hostaperm Orange)
 Violet Pigment . . . PV23 (manufactured by CLARIANT: Hostaperm Violet RL-NF)
 Violet Pigment . . . PV37 (manufactured by BASF: Cromophtal violet D5700)
 Green Pigment . . . PG36 (manufactured by DIC: FASTOGEN Green 2YK)
 Green Pigment . . . PG7 (manufactured by BASF: Heliogen Green D8370)
 Blue Pigment . . . PB 60 (manufactured by CLARIANT: PV Fast Blue L6472)
[For Ink Set B (Comparative Special Color Pigments)]
 Orange Pigment . . . PO43 (manufactured by CLARIANT: PV Fast Orange GRL)
 Violet pigment . . . PV29 (manufactured by DIC: QUINDO Violet 19 228-1119: "QUINDO" is a registered trademark of the company)
 Green pigment . . . PG50 (manufactured by BASF, SICOPAL GREEN K9610: "SICOPAL" is a registered trademark of the company)
<Polymer Dispersants>
 BYKjet9151 (manufactured by BYK)
 EFKA7701 (manufactured by BASF)
 EFKA4340 (manufactured by BASF)
 TEGO Dispers 685 (manufactured by IEGO)
<Distribution Synergists>
 Sol22000 (pigment dispersion synergist: manufactured by Luburizol Corporation, Solspers22000)
 AY3 (quinoline yellow dye derivative: manufactured by Tokyo Chemical Industry Co., Ltd., AY3)
 Sol5000 (pigment dispersion synergist: manufactured by Luburizol Corporation, Solspers5000)
<Polymerizable Compounds>
[For Pigment Dispersions 1 to 16]
 M220 (tripropione glycol diacrylate: manufactured by MIWON)
[For Pigment Dispersions 17 to 19]
 SR9003 (manufactured by Sartomer)
<<Preparation of Ink-1>>
Inks of the respective colors were prepared as follows by using the previously prepared pigment dispersions 1 to 16.
<Preparation of Inks 1-4, 101-104 (Ink Set A-Part 1)>
Each of the inks 1 to 4 and 101 to 104, which are the process color inks composing the ink set A, was prepared by mixing the materials shown in the following Table 4 in respective ratios. In order to mix the materials, each material was placed in a stainless steel beaker in each ratio and stirred for 1 hour while heating on a 65° C. hot plate.

TABLE 4

| | Ink set A-Part 1 | | | | | | | | |
|---|---|---|---|---|---|---|---|---|---|
| Ink No. | | 1 | 2 | 3 | 4 | 101 | 102 | 103 | 104 | Remarks |
| Pigment dispersion No. | 1 (Yellow) | 12.0 | | | | 12.0 | | | | |
| | 2 (Magenta) | | 24.0 | | | | 24.0 | | | |
| | 3 (Cyan) | | | 13.5 | | | | 13.5 | | |
| | 4 (Black) | | | | 12.5 | | | | 12.5 | |
| Polymerizable compound | A-400 | | | | | 20.0 | | | | |
| | M220 | | | | | 10.0 | | | | |
| | SR499 | 21.6 | 11.1 | 21.6 | 21.1 | 21.8 | 11.3 | 21.8 | 21.3 | |
| | Miramer M360 | | | | | 25.0 | | | | |
| | CN2303 | | | | | 5.0 | | | | |

TABLE 4-continued

| | Ink set A-Part 1 | | | | | | | | | |
|---|---|---|---|---|---|---|---|---|---|---|
| | Ink No. | 1 | 2 | 3 | 4 | 101 | 102 | 103 | 104 | Remarks |
| Gellant | WE11 | | 0.8 | | | | — | | | |
| | 18-Pentatriacontane | | 1.4 | | | | — | | | |
| | Nikka Amide S | | — | | | | | 2.0 | | Comparative gellant |
| Polymerization initiator | Irgacure819 | 3.0 | 1.5 | 1.5 | 3.0 | 3.0 | 1.5 | 1.5 | 3.0 | |
| | Speedcure 7010 | | | | | 1.0 | | | | |
| Surfactant | BYK307 | | | | | 0.05 | | | | |
| Polymerization inhibitor | UV-10 | | | | | 0.15 | | | | |

The inks 1 to 4 are process color inks composing the ink set A, and are inks composing Examples using the gellants represented by the general formulae (G1) and (G2) described in the embodiment. On the other hand, the inks 101 to 104 are process color inks composing the ink set A, but are inks composing Comparative Examples not using the gellants represented by the general formulae (G1) and (G2).

<Preparation of Inks 5 to 13, 201 to 206 (Ink Set B-Part 1)>

Each of the inks 5 to 13 and 201 to 206, which are the special color inks composing the ink set B, was prepared by mixing the materials shown in the following Table 5 in respective ratios. In order to mix the materials, each material was placed in a stainless steel beaker in each ratio and stirred for 1 hour while heating on a 65° C. hot plate.

11 to 13 contain a dispersion synergist. On the other hand, the inks 201 to 206 are special color inks composing the ink set B, but are inks composing Comparative Examples not using either the pigments described in the embodiment or the gellants represented by the general formulae (G1) and (G2).

The materials shown in the above Tables 4 and 5 are as follows.

<Polymerizable Compounds>

A-400 (polyethylene glycol 400 diacrylate: manufactured by Shin-Nakamura Chemical Co., Ltd.)

M220 (tripropione glycol diacrylate: manufactured by MIWON)

TABLE 5

| | Ink set B-Part 1 | | | | | | | | | | | | | | | |
|---|---|---|---|---|---|---|---|---|---|---|---|---|---|---|---|---|
| | Ink No. | 5 | 6 | 7 | 8 | 9 | 10 | 11* | 12* | 13* | 201 | 202 | 203 | 204 | 205 | 206 | Remarks |
| Pigment dispersion No. | 5 (Orange) | 24.0 | | | | | | | | | 24.0 | | | | | | |
| | 6 (Orange) | | 24.0 | | | | | | | | | | | | | | |
| | 7 (Violet) | | | 13.5 | | | | | | | | | 13.5 | | | | |
| | 8 (Violet) | | | | 13.5 | | | | | | | | | | | | |
| | 9 (Green) | | | | | 13.5 | | | | | | | | 13.5 | | | |
| | 10 (Green) | | | | | | 13.5 | | | | | | | | | | |
| | 11* (Orange) + (Sy) | | | | | | | 24.0 | | | | | | | | | |
| | 12* (Violet) + (Sy) | | | | | | | | 13.5 | | | | | | | | |
| | 13* (Blue) + (Sy) | | | | | | | | | 13.5 | | | | | | | |
| | 14 (Orange) | | | | | | | | | | | | | | 24.0 | | | Comparative special color pigment |
| | 15 (Violet) | | | | | | | | | | | | | | | 13.5 | | |
| | 16 (Green) | | | | | | | | | | | | | | | | 13.5 | |
| Polymerizable compound | A-400 | | | | | | | | 20.0 | | | | | | | | |
| | M220 | | | | | | | | 10.0 | | | | | | | | |
| | SR499 | 10.6 | 10.6 | 21.6 | 21.6 | 21.6 | 21.6 | 10.6 | 21.6 | 21.6 | 10.8 | 21.3 | 21.8 | 11.1 | 21.6 | 21.6 | |
| | Miramer M360 | | | | | | | | 25.0 | | | | | | | | |
| | CN2303 | | | | | | | | 5.0 | | | | | | | | |
| Gellant | WE11 | | | | 0.8 | | | | | | — | | | 0.8 | | | |
| | 18-Pentatria-contane | | | | 1.4 | | | | | | — | | | 1.4 | | | |
| | Nikka Amide S | | | | — | | | | | | | 2.0 | | — | | | Comparative gellant |
| Polymerization initiator | Irgacure819 | 2.0 | 2.0 | 1.5 | 1.5 | 1.5 | 1.5 | 2.0 | 1.5 | 1.5 | 2.0 | 2.0 | 1.5 | 1.5 | 1.5 | 1.5 | |
| | Speedcure 7010 | | | | | | | | 1.0 | | | | | | | | |
| Surfactant | BYK307 | | | | | | | | 0.05 | | | | | | | | |
| Polymerization inhibitor | UV-10 | | | | | | | | 0.15 | | | | | | | | |

The inks 5 to 13 are special color inks composing the ink set B, and are inks composing Examples using the pigments described in the embodiment and the gellants represented by the general formulae (G1) and (G2). Among them, the inks SR499 (6EO-modified trimethylolpropane triacrylate: manufactured by SARTMER Co.)

Miramer M360 (3PO-modified trimethylolpropane triacrylate: manufactured by MIWON)

CN2303 (polyester acrylate oligomer: manufactured by SARTMER Co.)

<Gellants>

WE11 (behenyl stearate: manufactured by NOF CORP.)

18-Pentatriacontane (distearyl ketone reagent: manufactured by Alfa Aesar)

Nikka Amide S (N-stearyl stearic acid amide: Nippon Kasei Co., Ltd.: "Nikka Amide" is a registered trademark of the company)

<Polymerization Initiators>

Irgacure819 (bis(2,4,6-trimethylbenzoyl)-phenylphosphine oxide: manufactured by BASF)

Speedcure7010 (1,3-di({α-[1-chloro-9-oxo-9H-thioxanthen-4-yeoxy]acetylpoly[oxy(1-methylethylene)]}oxy)-2,2-bis({α-[1-chloro-9-oxo-9H-thioxanthen-4-yl)oxy]acetylpoly[oxy(1-methylethylene)]}oxymethyl)propane: manufactured by Lambson)

<Surfactant>

BYK307 (polyether-modified polydimethylsiloxane: manufactured by BYK)

<Polymerization Inhibitor>

UV-10 (4,4'-[(1,10-dioxo-1,10-decanediyl)bis(oxy)]bis[2,2,6,6-tetramethyl]-1-piperidinyloxy: manufactured by BASF)

<<Preparation of Ink-Part 2>>

Inks of the respective colors of Comparative Examples not using the gellants represented by the general formulae (G1) and (G2) were prepared as follows by using the previously prepared pigment dispersions 1 to 4 and 17 to 19 (see Table 3).

<Preparation of Inks 105-108 (Ink Set A-Part 2)>

Each of the inks 105 to 108, which are the process color inks composing the ink set A and compose Comparative Examples, was prepared by mixing the materials shown in the following Table 6 at respective ratios. In this case, a gellant and a polymerizable compound were first stirred at 90° C. for 2 hours. The stirred solution was filtered at 85° C. to make the sizes of the particles in the solution 0.22 μm or less. The solution was allowed to solidify overnight at room temperature and then refiltered at 85° C. to make the sizes of the particles in the solution 0.22 μm or less. A polymerization initiator and a stabilizer were added to this solution, and the obtained ink base was stirred at 90° C. for 1 hour. The ink base was filtered at 85° C. to make the sizes of the particles in the solution 0.22 μm or less. The obtained solution was added to a solution of each pigment dispersion stirred at 90° C., and the obtained ink was stirred at 90° C. for 2 hours. Every ink was filtered at 85° C. to make the sizes of the particles in the solution 1 μm or less.

TABLE 6

| | Ink set A-Part 2 | | | | | |
|---|---|---|---|---|---|---|
| Ink No. | | 105 | 106 | 107 | 108 | Remarks |
| Pigment dispersion No. | 1 (Yellow) | 12.0 | | | | |
| | 2 (Magenta) | | 24.0 | | | |
| | 3 (Cyan) | | | 13.5 | | |
| | 4 (Black) | | | | 12.5 | |
| Polymerizable compound | SR9003 | 70.8 | 58.8 | 69.3 | 70.3 | |
| Gellant | Amide gellant | | | 7.5 | | Comparative gellant |

TABLE 6-continued

| | Ink set A-Part 2 | | | | | |
|---|---|---|---|---|---|---|
| Ink No. | | 105 | 106 | 107 | 108 | Remarks |
| Polymerization initiator | Irgacure379 | | | 3.0 | | |
| | DarocurITX | | | 2.0 | | |
| | Irgacure819 | | | 1.0 | | |
| | Irgacure127 | | | 3.5 | | |
| Stabilizer | IrgastabUV-10 | | | 0.2 | | |

Herein, the inks 105 to 108 are the process color inks composing the ink set A, but are inks composing Comparative Examples not using the gellants represented by the general formulae (G1) and (G2).

<Preparation of Inks 207 to 209 (Ink Set B-Part 2)>

Each of the inks 207 to 209, which are the special color inks composing the ink set B and compose Comparative Examples, was prepared by mixing the materials shown in the following Table 7 at respective ratios. In this case, all the components excluding the pigment dispersions shown in the following Table 7 were first combined and mixed at 90° C. and 200 rpm for approximately 1 hour to prepare a 20-g scale of a mixture. One hour later, the pigment dispersion was added to the mixed materials, and the combined ink was further stirred at 90° C. for 1 hour. Because the ink was completely miscible, a solution with a viscosity, at which the solution was able to be ejected at high temperature, was obtained and a gel, which became hard when cooled to room temperature, was formed. The pigment dispersions used herein, for respective special color inks, were not the special color pigments having the specific structure described in the embodiment, but contained the comparative pigments.

TABLE 7

| | Ink set B-Part 2 | | | | |
|---|---|---|---|---|---|
| Ink No. | | 207 | 208 | 209 | Remarks |
| Pigment dispersion No. | 17 (Orange) | 35.0 | | | |
| | 18 (Violet) | | 13.3 | | |
| | 19 (Green) | | | 26.7 | |
| Polymerizable compound | SR833S | 34.2 | 61.5 | 48.1 | |
| | SR9003 | 8.6 | | | |
| | SR399LV | 5.0 | 5.0 | 5.0 | |
| Gellant | Amide gellant | | 7.5 | | |
| | UNILIN 350 acrylate | | 5.0 | | Comparative gellant |
| Polymerization initiator | Irgacure379 | 1.0 | 3.0 | 3.0 | |
| | Irgacure819 | 1.0 | 0.5 | 0.5 | |
| | Esacure KIP 150 | 2.5 | 4.0 | 4.0 | |
| Stabilizer | IrgastabUV-10 | | 0.2 | | |

The inks 205 to 209 are special color inks composing the ink set B, but are inks composing Comparative Examples not using the gellants represented by the general formulae (G1) and (G2).

The materials shown in Tables 6 and 7 are as follows.

<Pigment Dispersions>

Pigment dispersions 1 to 4, 17 to 19 (see the above Table 3)

<Gellants>

Amide gellant (synthesized according to the procedure described in U.S. Pat. No. 8,084,637)

UNILIN350 acrylate (manufactured by Baker Petrolite: "UNILIN" is a registered trademark of the company)

<Polymerizable Compounds>

SR9003 (manufactured by Sartomer)

SR833S (tricyclodecanedimethanol diacrylate: manufactured by Sartomer)

SR399LV (pentafunctional acrylate ester: manufactured by Sartomer)

<Polymerization Initiators>

Irgacure379 (manufactured by BASF: "IRGACURE" is a registered trademark of the company)

DarocurITX (manufactured by BASF: "Darocur" is a registered trademark of the company)

Irgacure819 (manufactured by BASF)

Irgacure127 (manufactured by BASF)

Esacure KIP150 (manufactured by BASF: "ESACURE" is a registered trademark of the company)

<Stabilizer>

Irgastab UV10 (manufactured by BASF)

<<Ink-jet Recording Using Ink Sets>>

Images of Examples 1 to 9 and Comparative Examples 1 to 4, in which the respective inks obtained as described above were combined as shown in the following Table 8 to be used, were formed by using the ink-jet recording apparatus of an active ray curing type line recording system (single pass recording system) described with reference to FIGS. 1 and 2. The images were formed for each evaluation item.

In forming each image, ink-jet heads having a nozzle resolution of 600 dpi (manufactured by Konica Minolta, Inc.) were arranged in a staggered manner and introduced into a module in which nozzle rows of 1200 dpi were formed. The ink heads for supplying the inks for the ink set A were arranged on the upstream side in the conveying direction of the recording medium, while those for supplying the inks for the ink set B were arranged on the downstream side.

For each evaluation item, voltages were applied such that two sizes of dots respectively having droplet amounts of 3.5 pl and 9.0 pl were generated under the conditions in which ambient temperature was 25° C. and ambient humidity was 55%. On each recording medium, Pantone Solid and coated (1354 points) was printed with a size of 4 cm×4 cm at 1200×1200 dpi. Each image was obtained by emitting, with an LED light source unit (manufactured by HOYA CORP.), ultraviolet rays that were adjusted such that a peak wavelength was 395 nm, a peak illuminance was 2 W/cm$^2$, and an accumulated amount of light was 300 mJ/cm$^2$, to the ink droplets that landed. Herein, [dpi] represents the number of dots per 2.54 cm.

<<Evaluation of Image>>

<Color Gamut Reproducibility>

Each image was formed by using paper having a thickness of 0.46 mm (manufactured by Nippon Paper Industries Co., Ltd.; Ai Best W, basis weight: 420 g/m$^2$) as the recording medium and by adjusting voltages such that two sizes of dots respectively having droplet amounts of 3.5 pl and 9.0 pl were generated. A difference [ΔE] was calculated by comparing each of the printed images obtained in Examples 1 to 9 and Comparative Examples 1 to 4 with Pantone Reference Chart. A value was calculated, as a color reproduction area %, by dividing the number of points at which [ΔE] was 1 or less by 1354, and evaluated as follows. Evaluation results are also shown in Table 8.

◯◯: color reproduction area 75% or more

◯: color reproduction area 65% or more and less than 70%

Δ: color reproduction area 60% or more and less than 65% x: Color reproduction area less than 60%

<Gloss Homogeneity>

Each image was formed by using paper having a thickness of 1.2 mm (manufactured by Crown Package Co., Ltd., F-Flute) as the recording medium and by adjusting voltages such that two sizes of dots respectively having droplet amounts of 3.5 pl and 9.0 pl were generated. A difference between the gloss maximum value and the gloss minimum value of a patch in each of the printed images obtained in Examples 1 to 9 and Comparative Examples 1 to 4 was calculated as a [Δ gloss value], and evaluated as follows. For the measurement of the gloss values, 60° gloss was measured by using a handy type gloss meter, PG-II (manufactured by Nippon Denshoku Industries Co., Ltd.), and a variation value was calculated. Evaluation results are also shown in Table 8.

◯◯: [Δ gloss value] less than 15

◯: [Δ gloss value] 15 or more and less than 30

Δ: [Δ gloss value] 30 or more and less than 40 x: [Δ gloss value] 40 or more

<Dot Size Uniformity>

Each image was formed by using paper having a thickness of 1.2 mm (manufactured by Crown Package Co., Ltd., F-Flute) as the recording medium and by adjusting a voltage such that one size of dot having a droplet amount of 9.0 pl was generated. In each of the printed images obtained in Examples 1 to 9 and Comparative Examples 1 to 4, the average dot size of ten out of the printing dots of the ink, ejected from the ink head located at the most upstream in the conveying direction of the recording medium, was taken as [A]. On the other hand, the average dot size of ten out of the printing dots of the ink, ejected from the ink head located at the most downstream in the conveying direction of the recording medium, was taken as [B]. Then, [B−A] was calculated as a [Δ dot size], and evaluated as follows. The dot sizes were measured by observing the printed images at 500-times magnification with an optical microscope. Evaluation results are also shown in Table 8.

◯◯: [Δ dot size] 8 μm or less

◯: [Δ dot size] more than 8 μm and 12 μm or less

Δ: [Δ dot size] more than 12 μm and 16 μm or less x: Unmeasurable due to exceeding 16 μm or bleeding

TABLE 8

|  | Ink set A | | | | Ink set B | | | |
| --- | --- | --- | --- | --- | --- | --- | --- | --- |
|  | Yellow | Magenta | Cyan | Black | Orange | Violet | Green | Blue |
| Example 1 | Ink 1 | Ink 2 | Ink 3 | Ink 4 | Ink 5 | Ink 7 | — | — |
| Example 2 |  |  |  |  | Ink 5 | — | Ink 9 | — |
| Example 3 |  |  |  |  | — | Ink 7 | Ink 9 | — |
| Example 4 |  |  |  |  | Ink 5 | Ink 7 | Ink 9 | — |
| Example 5 |  |  |  |  | Ink 6 | Ink 8 | Ink 10 | — |
| Example 6 |  |  |  |  | Ink 11* | Ink 7 | Ink 9 | — |
| Example 7 |  |  |  |  | Ink 5 | Ink 12* | Ink 9 | — |
| Example 8 |  |  |  |  | Ink 11* | Ink 12* | Ink 9 | — |
| Example 9 |  |  |  |  | Ink 11* | — | Ink 9 | Ink 13* |
| Comparative Example 1 | Ink 1 | Ink 2 | Ink 3 | Ink 4 | — | — | — | — |

TABLE 8-continued

| | | | | | | | | |
|---|---|---|---|---|---|---|---|---|
| Comparative Example 2 | Ink 101 | Ink 102 | Ink 103 | Ink 104 | Ink 201 | Ink 202 | Ink 203 | — |
| Comparative Example 3 | Ink 1 | Ink 2 | Ink 3 | Ink 4 | Ink 204 | Ink 205 | Ink 206 | — |
| Comparative Example 4 | Ink 105 | Ink 106 | Ink 107 | Ink 108 | Ink 207 | Ink 208 | Ink 209 | — |

| | Evaluation results | | | |
|---|---|---|---|---|
| | Color gamut reproducibility | Gloss homogeneity | Dot size uniformity | Remarks |
| Example 1 | ○ | ○ | ○○ | |
| Example 2 | Δ | ○ | ○○ | |
| Example 3 | Δ | ○ | ○○ | |
| Example 4 | ○○ | ○ | ○○ | |
| Example 5 | ○○ | ○ | ○○ | |
| Example 6 | ○○ | ○○ | ○○ | |
| Example 7 | ○○ | ○○ | ○○ | |
| Example 8 | ○○ | ○○ | ○○ | |
| Example 9 | ○○ | ○○ | ○○ | |
| Comparative Example 1 | x | ○○ | ○○ | |
| Comparative Example 2 | Δ | Δ | Δ | Comparative gellant |
| Comparative Example 3 | Δ | x | Δ | Comparative special color pigment |
| Comparative Example 4 | Δ | x | x | Comparative gellant/special color pigment |

In Examples 1 to 9, an image was formed by using the inks 1 to 4 of the ink set A, in which the gellants represented by the general formulae (G1) and (G2) were used, and the ink set comprising the inks 5 to 13 in which the gellants represented by the general formulae (G1) and (G2) and the special color pigments described in the embodiment were used, as shown in Table 8. It has been confirmed that the printed images obtained in Examples 1 to 9 are excellent in the color gamut reproducibility, the gloss homogeneity, and the dot size uniformity as compared with the printed images obtained in Comparative Examples 1 to 4.

More specifically, it has been confirmed that: the color gamut reproducibility in Examples 4 to 9 using, as the ink set B, inks of three special colors among orange, violet, green, and blue is much better than that in Comparative Examples 2 to 4 using the same number of special color inks; and the color gamut reproducibility can be improved to such an extent that the Pantone Color Gamut can be sufficiently covered.

Also, the gloss homogeneity and the dot size uniformity in Examples 1 to 9 were more excellent than those in Comparative Examples 2 to 4 using both the process color inks of the ink set A and the special color inks of the ink set B. Thereby, it has been confirmed that in forming an image using special color inks, gloss homogeneity and dot size uniformity can be improved by applying the present invention.

Also, in the above image evaluation, a recording medium likely to store heat due to a thickness as large as 1.2 mm is used, and in Examples 1 to 9 to which the present invention is applied, it has been particularly confirmed that a variation in the dot sizes of each ink, occurring due to a landing order on a recording medium, can be suppressed even for such a recording medium. Thereby, it has been confirmed that: dot size uniformity due to a landing order on a recording medium can be ensured by applying the present invention even for a recording medium having a large thickness; and as a result, an image can be formed in which a color difference in each ink is small, leveling uniformity is also good, and color gamut reproducibility is excellent.

In Examples 6 to 9 using the inks 11 to 13 each containing a dispersion synergist, excellent gloss homogeneity and dot size uniformity, comparable to those in Comparative Example 1 using only the process color inks of the ink set A, are particularly obtained, and hence an effect of incorporating a dispersion synergist into a special color ink has been confirmed. In each of the above Examples, the case where in forming an image, the ink heads for supplying the inks of the ink set A are arranged on the upstream side in the conveying direction of a recording medium and those for supplying the inks of the ink set B are arranged on the downstream side thereof. However, it has been confirmed that the same effect can be obtained even when an image is formed with the ink set A and the ink set B arranged in reverse.

DESCRIPTION OF THE REFERENCE NUMERALS

1 . . . INK-JET RECORDING APPARATUS
11 . . . INK FLOW PATH
13 . . . HEAD CARRIAGE
13y . . . HEAD CARRIAGE FOR YELLOW INK
13m . . . HEAD CARRIAGE FOR MAGENTA INK
13c . . . HEAD CARRIAGE FOR CYAN INK
13bk . . . HEAD CARRIAGE FOR BLACK INK
13o . . . HEAD CARRIAGE FOR ORANGE INK
13g . . . HEAD CARRIAGE FOR GREEN INK
13v . . . HEAD CARRIAGE FOR VIOLET INK
15 . . . INK HEAD
17 . . . TEMPERATURE CONTROL UNIT
19 . . . LIGHT EMISSION UNIT
100 . . . STORAGE TANK
100y . . . STORAGE TANK FOR YELLOW INK
100m . . . STORAGE TANK FOR MAGENTA INK
100c . . . STORAGE TANK FOR CYAN INK

100bk . . . STORAGE TANK FOR BLACK INK
100o . . . STORAGE TANK FOR ORANGE INK
100g . . . STORAGE TANK FOR GREEN INK
100v . . . STORAGE TANK FOR VIOLET INK
200 . . . RECORDING MEDIUM

The invention claimed is:

1. An ink set comprising:
    an ink set A including a yellow ink, a magenta ink, a cyan ink, and a black ink; and
    an ink set B including at least two inks selected from among an orange ink, a green ink, a violet ink, and a blue ink,
    wherein of the ink set B, the orange ink contains an orange pigment having a cyclic structure and a basic moiety in the cyclic structure,
    wherein the green ink contains a green pigment having a copper phthalocyanine structure,
    wherein the violet ink contains a violet pigment having a dioxazine skeleton, and wherein each of the inks included in the ink set A and the ink set B contains, as a gellant, at least one compound selected from among compounds represented by the following general formula (G1) and compounds represented by the following general formula (G2):

R1-CO—R2        General Formula (G1)

R3-COO—R4       General Formula (G2)

wherein R1 to R4 in the general formulae (G1) and (G2) each independently represent a $C_{9-25}$ chain hydrocarbon group.

2. The ink set according to claim 1, wherein
    the orange ink, the violet ink, and the blue ink contain a dispersion synergist.

3. An ink-jet recording method for sequentially supplying each of the inks composing the ink set according to claim 1 to a recording medium from a plurality of ink heads arranged along a conveying direction of the recording medium.

4. The ink-jet recording method according to claim 3, wherein
    before or after each of the inks composing the ink set A is sequentially supplied to the recording medium, each of the inks composing the ink set B is sequentially supplied.

* * * * *